United States Patent
Rollinger et al.

(10) Patent No.: US 9,382,823 B2
(45) Date of Patent: *Jul. 5, 2016

(54) CRANKCASE INTEGRITY BREACH DETECTION

(71) Applicant: Ford Global Technologies, LLC, Dearborn, MI (US)

(72) Inventors: John Eric Rollinger, Troy, MI (US); Robert Roy Jentz, Westland, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/745,084

(22) Filed: Jun. 19, 2015

(65) Prior Publication Data

US 2015/0285111 A1  Oct. 8, 2015

Related U.S. Application Data

(63) Continuation of application No. 13/619,676, filed on Sep. 14, 2012, now Pat. No. 9,068,486.

(51) Int. Cl.
| | |
|---|---|
| *F01M 13/00* | (2006.01) |
| *F02N 11/10* | (2006.01) |
| *F02M 11/10* | (2006.01) |
| *F02M 35/10* | (2006.01) |
| *F02D 41/22* | (2006.01) |
| *F01M 1/18* | (2006.01) |
| *F01M 13/04* | (2006.01) |
| *F02D 41/00* | (2006.01) |
| *F02D 41/06* | (2006.01) |

(52) U.S. Cl.
CPC ............... *F01M 13/00* (2013.01); *F01M 1/18* (2013.01); *F01M 13/04* (2013.01); *F02D 41/0025* (2013.01); *F02D 41/22* (2013.01); *F02M 11/10* (2013.01); *F02M 35/10222* (2013.01); *F02N 11/10* (2013.01); *F02D 41/062* (2013.01); *Y02T 10/40* (2013.01)

(58) Field of Classification Search
CPC .......... F01N 13/00; F01N 1/18; F02M 11/10; F02M 35/10222; F02M 35/10386; F02D 41/062; F02D 14/22
See application file for complete search history.

(56) References Cited

U.S. PATENT DOCUMENTS

| | | |
|---|---|---|
| 5,585,552 A | 12/1996 | Heuston et al. |
| 5,792,949 A | 8/1998 | Hewelt et al. |
| 5,897,597 A | 4/1999 | O'Daniel |
| 6,240,772 B1 | 6/2001 | Thomas |
| 6,247,464 B1 | 6/2001 | Maegawa et al. |
| 6,779,388 B2 | 8/2004 | Baeuerle et al. |
| 7,080,547 B2 | 7/2006 | Beyer et al. |
| 7,275,527 B2 | 10/2007 | Bruchner et al. |
| 7,886,727 B2 | 2/2011 | Ulrey et al. |
| 7,963,033 B2 | 6/2011 | Squires |

(Continued)

*Primary Examiner* — Hieu T Vo
(74) *Attorney, Agent, or Firm* — Julia Voutyras; Alleman Hall McCoy Russell & Tuttle LLP

(57) ABSTRACT

Methods and systems are provided for using a crankcase vent tube pressure or flow sensor for diagnosing a location and nature of crankcase system integrity breach. The same sensor can also be used for diagnosing air filter plugging and PCV valve degradation. Use of an existing sensor to diagnose multiple engine components provides cost reduction and sensor compaction benefits.

20 Claims, 11 Drawing Sheets

(56) References Cited

U.S. PATENT DOCUMENTS

| | | | |
|---|---|---|---|
| 8,047,185 B2 | 11/2011 | Ulrey et al. | |
| 8,109,259 B2 | 2/2012 | Ulrey et al. | |
| 8,800,276 B2 | 8/2014 | Levin et al. | |
| 9,068,486 B2 * | 6/2015 | Rollinger | F01M 13/00 701/101 |
| 9,097,149 B2 | 8/2015 | Beshay et al. | |
| 2005/0022795 A1 | 2/2005 | Beyer et al. | |
| 2009/0211545 A1 | 8/2009 | Satou | |
| 2010/0031936 A1 | 2/2010 | Ofner | |
| 2010/0095746 A1 | 4/2010 | Lund | |
| 2010/0147270 A1 | 6/2010 | Pursifull et al. | |
| 2011/0017155 A1 | 1/2011 | Jacob | |
| 2011/0023852 A1 | 2/2011 | Yamashita | |
| 2011/0030658 A1 | 2/2011 | Ulrey et al. | |
| 2011/0120432 A1 | 5/2011 | Ulrey et al. | |
| 2013/0282255 A1 | 10/2013 | Pursifull | |
| 2014/0076249 A1 | 3/2014 | Rollinger et al. | |
| 2014/0081550 A1 | 3/2014 | Jentz et al. | |
| 2014/0081551 A1 | 3/2014 | Rollinger et al. | |
| 2014/0081564 A1 | 3/2014 | Pursifull et al. | |

\* cited by examiner

CRANKCASE INTEGRITY BREACH DETECTION

CROSS REFERENCE TO RELATED APPLICATIONS

The present application is a continuation of U.S. patent application Ser. No. 13/619,676, entitled "CRANKCASE INTEGRITY BREACH DETECTION," filed on Sep. 14, 2012, the entire contents of which are hereby incorporated by reference for all purposes.

BACKGROUND/SUMMARY

Engines may include crankcase ventilation systems to vent gases out of the crankcase and into an engine intake manifold to provide continual evacuation of gases from inside the crankcase in order to reduce degradation of various engine components in the crankcase. Crankcase ventilation systems may be intermittently monitored to identify breaches in the system. For example, a crankcase vent tube may become disconnected, an oil cap may be off or loose, a dipstick may be out, and/or other seals in the crankcase ventilation system may become broken resulting in degradation of various components included in the crankcase.

Diagnostic blow-by approaches may be used to monitor crankcase ventilation system integrity. For example, a pressure sensor may be used in the crankcase and a valve in a PCV fresh air hose may be opened so that pressure or vacuum changes may be sensed in the crankcase to determine if there is a breach in the system. In other approaches, a plurality of absolute sensors, e.g., a barometric pressure sensor (BP), a compressor inlet pressure sensor (CIP), a throttle inlet pressure sensor (TIP), a manifold air pressure sensor (MAP), etc., may be used in combination to monitor crankcase ventilation system integrity.

However, the inventors herein have recognized that such approaches may add additional hardware to such monitoring systems, e.g., additional sensors and valves, thus increasing costs and complexity of a crankcase ventilation monitoring system. In addition, based on the location of the sensor, some combinations of pressure sensors may read substantially the same pressure under certain conditions. As a result, system redundancy occurs without any improvement in the accuracy of a diagnostic routine.

In one approach, to at least partially address these issues, a method for an engine is provided. The method comprises indicating crankcase ventilation system degradation based on characteristics of a transient dip in crankcase vent tube pressure, during engine cranking. In this way, a system breach can be detected by an existing pressure sensor.

In one example, an engine crankcase ventilation system may include a crankcase vent tube coupled between an air intake passage and a crankcase. A pressure sensor (or flow sensor) may be positioned within the crankcase vent tube for providing an estimate of flow or pressure of air flowing through the vent tube. During engine cranking, and while an air flow through the vent tube and into the intake manifold is low, a transient dip in pressure may be sensed by the crankcase vent tube pressure sensor. In response to an amplitude of the transient dip being smaller than a threshold (e.g., a substantially negligible transient dip in crankcase vent tube pressure), a controller may infer that flow through the vent tube is disrupted due to a breach in the integrity of the crankcase ventilation system. For example, the controller may infer that the crankcase vent tube may have gotten disconnected.

The controller may further confirm crankcase system degradation based on a change in steady-state vent tube pressure relative to a change in steady-state manifold vacuum after engine cranking, and while manifold vacuum is higher than a threshold. For example, in response to the change in steady-state vent tube pressure not being varying with the change in steady-state manifold vacuum, crankcase system degradation may be determined and a mitigating action may be performed. This may include the controller setting an appropriate diagnostic code while also limiting engine speed or load so as to delay depletion of lubricant from the breached crankcase and aspiration of lubricant from the crankcase into engine components.

In this way, by using an existing pressure sensor to identify crankcase system breach, the number of sensors and valves employed in a crankcase ventilation monitoring system may be reduced, providing cost and complexity reduction benefits without reducing accuracy of degradation detection. By using different characteristics of a crankcase vent tube pressure sensor output during cranking as well as after cranking to detect crankcase system degradation, disconnection of a crankcase vent tube may be diagnosed more reliably and accurately. Further, the approach enables the crankcase ventilation system to remain active during a diagnostic procedure.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
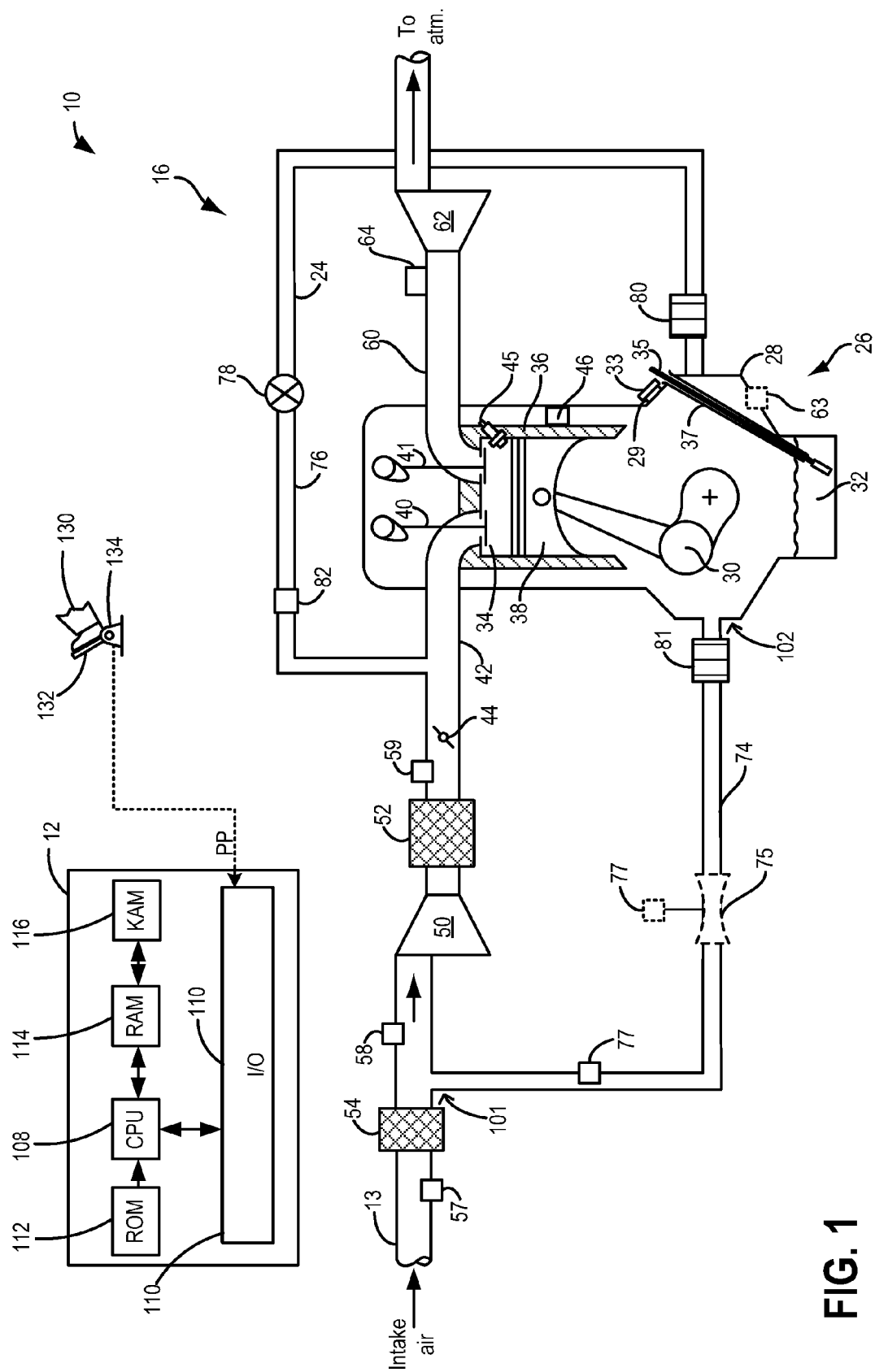
FIG. 1 shows a partial engine view in accordance with the disclosure.
Figure 5:
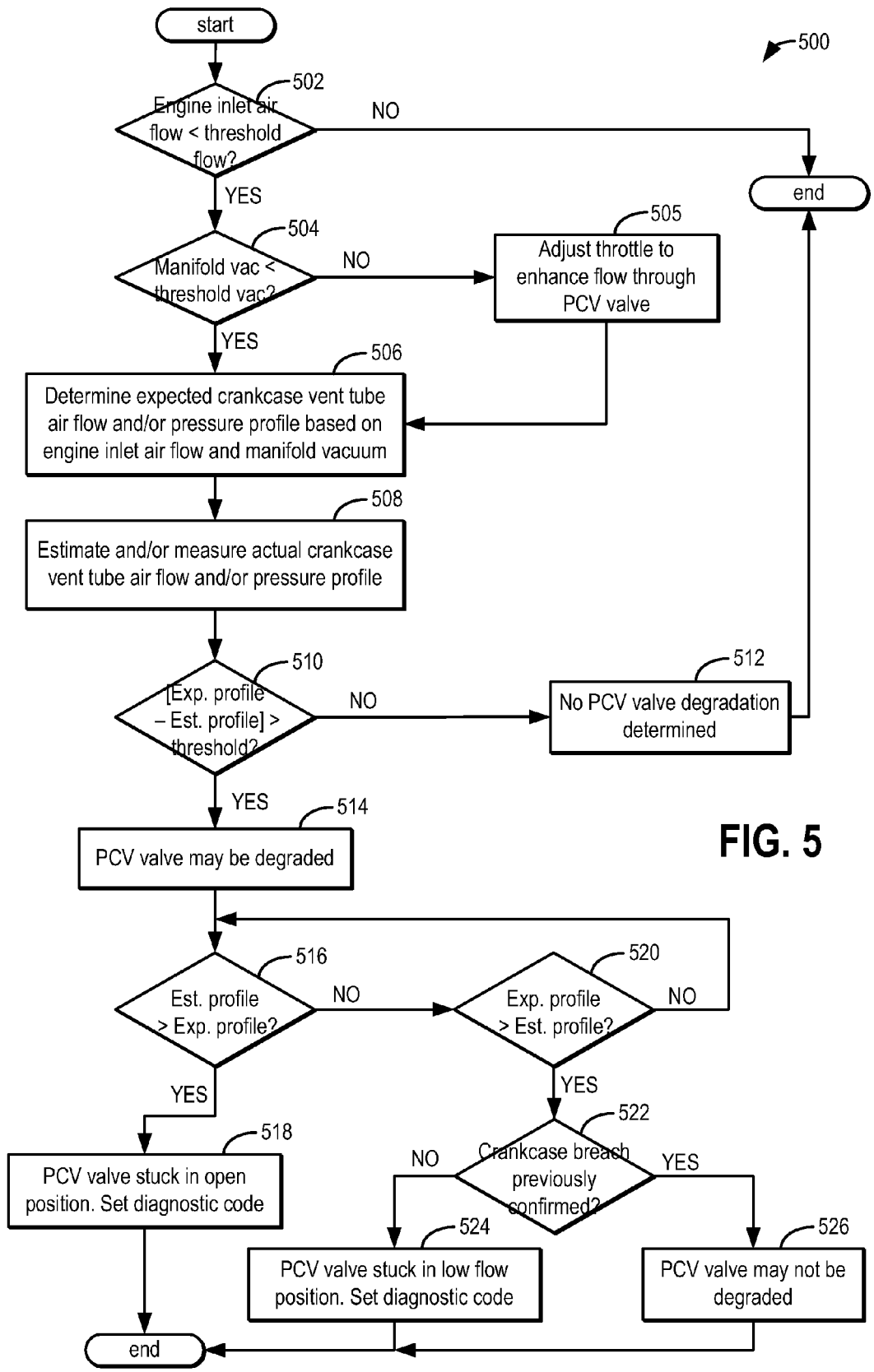
FIG. 5 shows an example method for indicating PCV valve degradation based on changes in crankcase vent tube air flow during condition of low manifold air flow.
Figure 6:
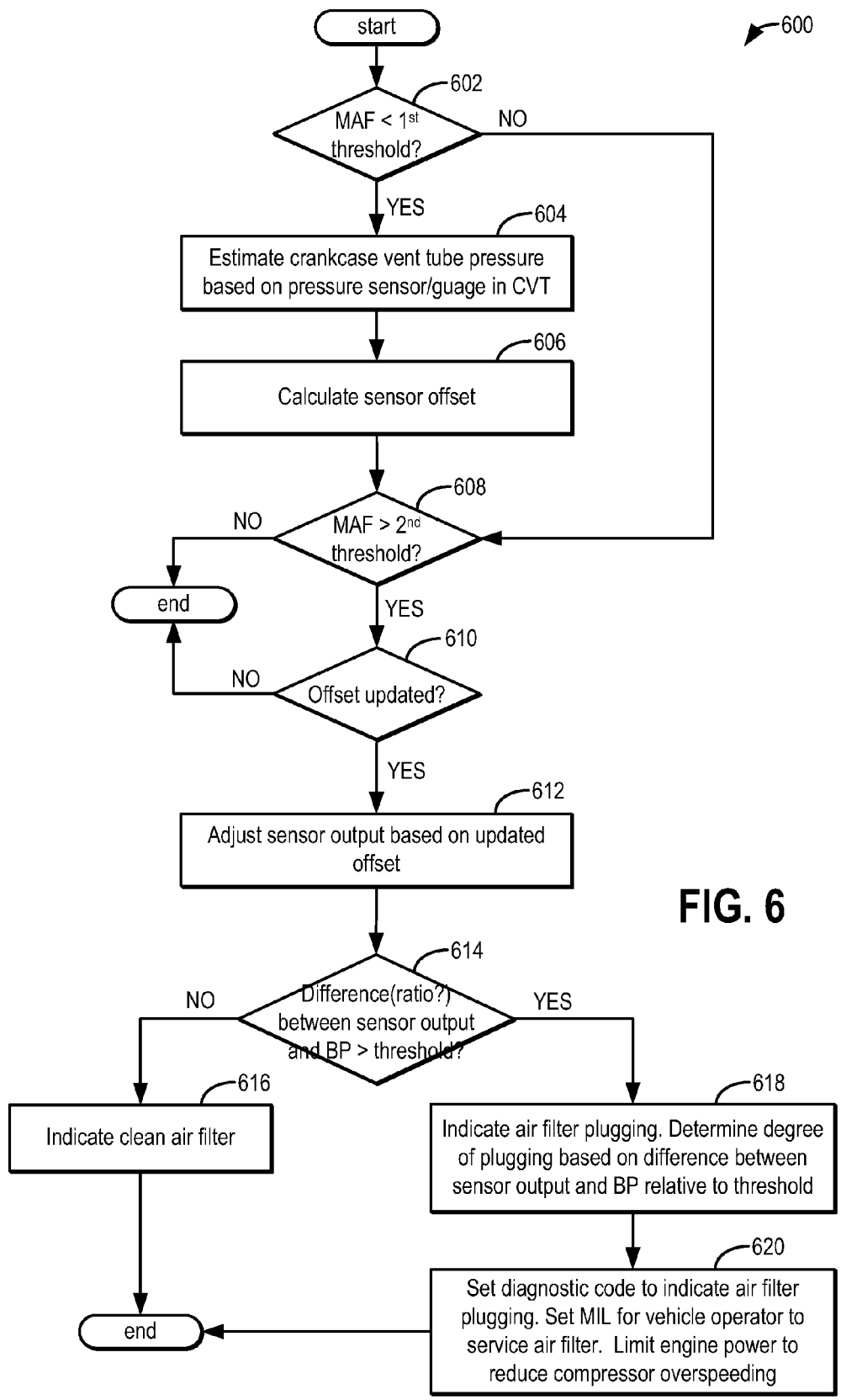
FIG. 6 shows an example method for indicating plugging of an air inlet filter based on the output of a pressure sensor positioned in the crankcase vent tube.
Figure 9:
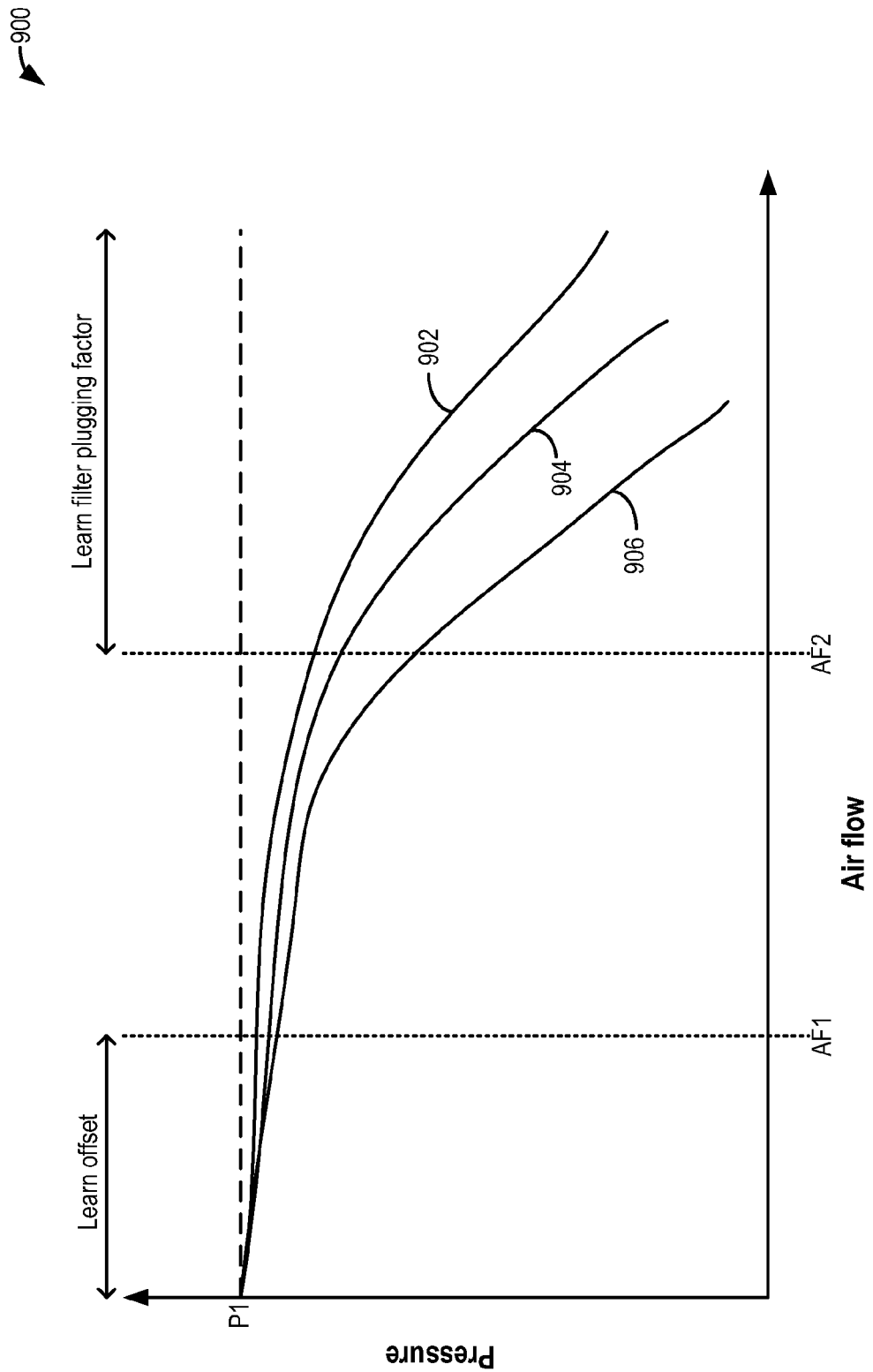
FIG. 9 shows an example map for indicating air filter plugging based on changes in a crankcase vent tube pressure relative to changing manifold air flow.
Figure 10:
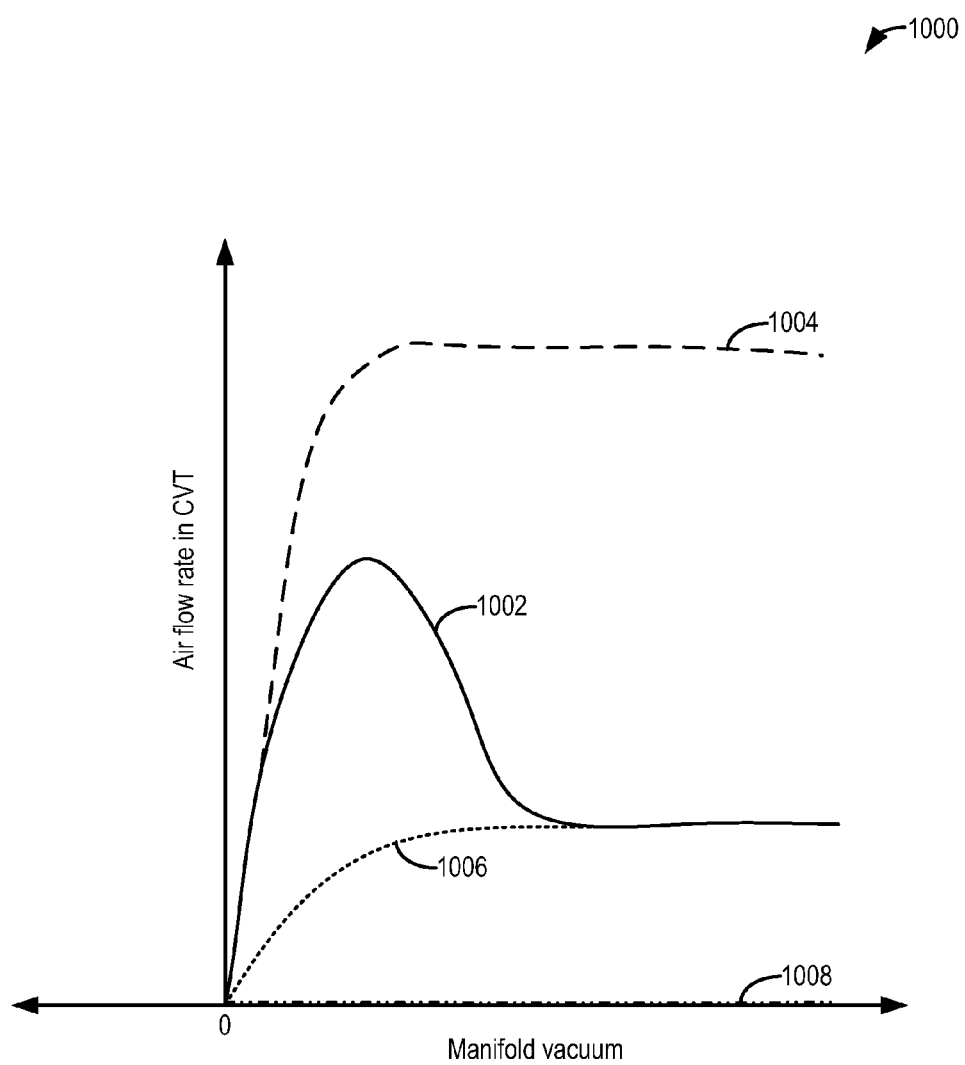
FIG. 10 shows example changes in crankcase vent tube pressure that may be used to indicate degradation of a PCV valve.

The following description relates to systems and methods for monitoring crankcase ventilation system integrity in an engine crankcase ventilation system, such as the system of FIG. 1. The output of one or more pressure or flow sensors, such as a pressure sensor positioned in a crankcase vent tube of the crankcase ventilation system, may be used to identify crankcase system breach, a location of the breach, PCV valve degradation, as well as air filter plugging. An engine controller may be configured to perform various routines, such as the routines of FIGS. 2A-2B, and 3-6 to indicate crankcase ventilation system degradation based on changes in crankcase vent tube pressure (or air flow) during engine cranking as well as changes in crankcase vent tube pressure relative to changes in manifold air flow during engine running. The crankcase vent tube pressure sensor can be orientated to read static pressure or dynamic pressure. Further, it can be placed in a venturi (necked down portion of the vent tube) and thus be sensitive to either pressure or flow rate or both. For example, the controller may determine a crankcase system breach based on characteristics of a transient dip in crankcase vent tube pressure, and then further identify a location and origin of the breach based on each of the transient dip and changes in crankcase vent tube vacuum during engine running (FIGS. 3, 4, 7, and 8). As another example, the controller may determine PCV valve degradation based on deviations of an expected crankcase vent tube pressure/air flow profile relative to an actual pressure/air flow profile (FIGS. 5, and 10). Further still, the controller may detect air filter plugging (or inlet hose collapse) based on deviations of a vent tube pressure level from a reference pressure during high manifold air flow conditions, wherein the reference pressure (and a related offset) is learned during low manifold air flow conditions (FIGS. 6 and 9). By using the same sensor to identify degradation in various system components, hardware reduction benefits are achieved without compromising accuracy of detection.

Referring now to FIG. 1, it shows an example system configuration of a multi-cylinder internal combustion engine, generally depicted at 10, which may be included in a propulsion system of an automotive vehicle. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP.

Engine 10 may include a lower portion of the engine block, indicated generally at 26, which may include a crankcase 28 encasing a crankshaft 30 with oil well 32 positioned below the crankshaft. An oil fill port 29 may be disposed in crankcase 28 so that oil may be supplied to oil well 32. Oil fill port 29 may include an oil cap 33 to seal oil port 29 when the engine is in operation. A dip stick tube 37 may also be disposed in crankcase 28 and may include a dipstick 35 for measuring a level of oil in oil well 32. In addition, crankcase 28 may include a plurality of other orifices for servicing components in crankcase 28. These orifices in crankcase 28 may be maintained closed during engine operation so that a crankcase ventilation system (described below) may operate during engine operation.

The upper portion of engine block 26 may include a combustion chamber (i.e., cylinder) 34. The combustion chamber 34 may include combustion chamber walls 36 with piston 38 positioned therein. Piston 38 may be coupled to crankshaft 30 so that reciprocating motion of the piston is translated into rotational motion of the crankshaft. Combustion chamber 34 may receive fuel from fuel injector 45 (configured herein as a direct fuel injector) and intake air from intake manifold 42 which is positioned downstream of throttle 44. The engine block 26 may also include an engine coolant temperature (ECT) sensor 46 input into an engine controller 12 (described in more detail below herein).

A throttle 44 may be disposed in the engine intake to control the airflow entering intake manifold 42 and may be preceded upstream by compressor 50 followed by charge air cooler 52, for example. An air filter 54 may be positioned upstream of compressor 50 and may filter fresh air entering intake passage 13. The intake air may enter combustion chamber 34 via cam-actuated intake valve system 40. Likewise, combusted exhaust gas may exit combustion chamber 34 via cam-actuated exhaust valve system 41. In an alternate embodiment, one or more of the intake valve system and the exhaust valve system may be electrically actuated.

Exhaust combustion gases exit the combustion chamber 34 via exhaust passage 60 located upstream of turbine 62. An exhaust gas sensor 64 may be disposed along exhaust passage 60 upstream of turbine 62. Turbine 62 may be equipped with a wastegate (not shown) bypassing it. Sensor 64 may be a suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Exhaust gas sensor 64 may be connected with controller 12.

In the example of FIG. 1, a positive crankcase ventilation (PCV) system 16 is coupled to the engine intake so that gases in the crankcase may be vented in a controlled manner from the crankcase. During non-boosted conditions (when manifold pressure (MAP) is less than barometric pressure (BP)), the crankcase ventilation system 16 draws air into crankcase 28 via a breather or crankcase vent tube 74. A first side 101 of crankcase vent tube 74 may be mechanically coupled, or connected, to fresh air intake passage 13 upstream of compressor 50. In some examples, the first side 101 of crankcase ventilation tube 74 may be coupled to intake passage 13 downstream of air cleaner 54 (as shown). In other examples, the crankcase ventilation tube may be coupled to intake passage 13 upstream of air cleaner 54. A second, opposite side 102 of crankcase ventilation tube 74 may be mechanically coupled, or connected, to crankcase 28 via an oil separator 81.

Crankcase vent tube 74 further includes a sensor 77 coupled therein for providing an estimate about air flowing through crankcase vent tube 74 (e.g., flow rate, pressure, etc.). In one embodiment, crankcase vent tube sensor 77 may be a pressure sensor. When configured as a pressure sensor, sensor 77 may be an absolute pressure sensor or a gauge sensor. In an alternate embodiment, sensor 77 may be a flow sensor or flow meter. In still another embodiment, sensor 77 may be configured as a venturi. In some embodiments, in addition to a pressure or flow sensor 77, the crankcase vent tube may optionally include a venturi 75 for sensing flow therethrough. In still other embodiments, pressure sensor 77 may be coupled to a neck of venturi 75 to estimate a pressure drop across the venturi. One or more additional pressure and/or flow sensors may be coupled to the crankcase ventilation system at alternate locations. For example, a barometric pressure sensor (BP sensor) 57 may be coupled to intake passage 13, upstream of air filter 54, for providing an estimate of barometric pressure. In one example, where crankcase vent tube sensor 77 is configured as a gauge sensor, BP sensor 57 may be used in conjunction with gauge pressure sensor 77. In some embodiments, a pressure sensor (not shown) may be coupled in intake passage 13 downstream of air filter 54 and upstream of compressor 50 to provide an estimate of the compressor inlet pressure (CIP). However, since crankcase vent tube pressure sensor 77 may provide an accurate estimate of a compressor inlet pressure during elevated engine air flow conditions (such as during engine run-up), the need for a dedicated CIP sensor may be reduced. Further still, a pressure sensor 59 may be coupled downstream of compressor 50 for providing an estimate of a throttle inlet pressure (TIP). Any of the above-mentioned pressure sensors may be absolute pressure sensor or gauge sensors.

PCV system 16 also vents gases out of the crankcase and into intake manifold 42 via a conduit 76 (herein also referred to as PCV line 76). In some examples, PCV line 76 may include a one-way PCV valve 78 (that is, a passive valve that tends to seal when flow is in the opposite direction) to provide continual evacuation of crankcase gases from inside the crankcase 28 before connecting to the intake manifold 42. In one embodiment, the PCV valve may vary its flow restriction in response to the pressure drop across it (or flow rate through it). However, in other examples conduit 76 may not include a one-way PCV valve. In still other examples, the PCV valve may be an electronically controlled valve that is controlled by controller 12. It will be appreciated that, as used herein, PCV flow refers to the flow of gases through conduit 76 from the crankcase to the intake manifold. Similarly, as used herein, PCV backflow refers to the flow of gases through conduit 76 from the intake manifold to the crankcase. PCV backflow may occur when intake manifold pressure is higher than crankcase pressure (e.g., during boosted engine operation). In some examples, PCV system 16 may be equipped with a check valve for preventing PCV backflow. It will be appreciated that while the depicted example shows PCV valve 78 as a passive valve, this is not meant to be limiting, and in alternate embodiments, PCV valve 78 may be an electronically controlled valve (e.g., a powertrain control module (PCM) controlled valve) wherein a controller may command a signal to change a position of the valve from an open position (or a position of high flow) to a closed position (or a position of low flow), or vice versa, or any position there-between.

The gases in crankcase 28 may consist of un-burned fuel, un-combusted air, and fully or partially combusted gases. Further, lubricant mist may also be present. As such, various oil separators may be incorporated in crankcase ventilation system 16 to reduce exiting of the oil mist from the crankcase through the PCV system. For example, PCV line 76 may include a uni-directional oil separator 80 which filters oil from vapors exiting crankcase 28 before they re-enter the intake manifold 42. Another oil separator 81 may be disposed in conduit 74 to remove oil from the stream of gases exiting the crankcases during boosted operation. Additionally, PCV line 76 may also include a vacuum sensor 82 coupled to the PCV system. In other embodiments, a MAP or manifold vacuum (ManVac) sensor may be located in intake manifold 42.

The inventors herein have recognized that by positioning pressure sensor 77 in the crankcase vent tube 74, a breach in crankcase system integrity can be detected not only at high engine air flow conditions, but also at low engine air flow conditions based on pull-down of vacuum in the vent tube. At the same time, the crankcase vent tube pressure sensor 77 can also see crankcase pulsations. This allows crankcase system degradation to be identified more accurately while also enabling a location of crankcase system breach to be reliably discerned. As such, since the pressure sensor in the vent tube is used to infer or estimate the presence of air flow through the vent tube, the pressure sensor can also be used as (or interchanged with) a flow meter or a gauge. Thus, in some embodiments, crankcase system breach can also be identified using a flow meter or a venturi in the crankcase vent tube. Since flow through the crankcase vent tube is also affected by the opening/closing of PCV valve 78, the same crankcase vent tube sensor can also be advantageously used to diagnose PCV valve degradation. Further still, since the crankcase vent tube pressure sensor will sense the compressor inlet pressure during engine running conditions when engine air flow is elevated, the need for a CIP sensor can be reduced. Additionally, since flow through the crankcase vent tube is also affected by the plugging state of air filter 54, the same crankcase vent tube sensor can also be advantageously used for the diagnosis of air filter clogging. In this way, by using an existing crankcase vent tube pressure or air flow sensor of an engine system for diagnosing various engine components, such as a PCV valve, an intake air filter, as well as for crankcase ventilation system breach diagnosis, hardware and software reduction benefits can be achieved in the engine system.

Controller 12 is shown in FIG. 1 as a microcomputer, including microprocessor unit 108, input/output ports 110, an electronic storage medium for executable programs and calibration values shown as read only memory chip 112 in this particular example, random access memory 114, keep alive memory 116, and a data bus. Controller 12 may receive various signals from sensors coupled to engine 10, including measurement of inducted mass air flow (MAF) from mass air flow sensor 58; engine coolant temperature (ECT) from temperature sensor 46; PCV pressure from vacuum sensor 82; exhaust gas air/fuel ratio from exhaust gas sensor 64; crankcase vent tube pressure sensor 77, BP sensor 57, CIP sensor 58, TIP sensor 59, etc. Furthermore, controller 12 may monitor and adjust the position of various actuators based on input received from the various sensors. These actuators may include, for example, throttle 44, intake and exhaust valve systems 40, 41, and PCV valve 78. Storage medium read-only memory 112 can be programmed with computer readable data representing instructions executable by processor 108 for performing the methods described below, as well as other variants that are anticipated but not specifically listed. Example methods and routines are described herein with reference to FIGS. 2A-6.

In this way, the system of FIG. 1 enables various methods for diagnosing engine components coupled to a crankcase ventilation system based at least on an estimated crankcase vent tube pressure. In one embodiment, a method for an engine is enabled comprising, indicating crankcase ventilation system degradation based on characteristics of a transient dip in crankcase vent tube pressure, during engine cranking. In another embodiment, an engine method is enabled comprising, indicating a location of crankcase ventilation system breach based on each of a transient dip in crankcase vent tube pressure during cranking and a change in crankcase vent tube pressure during steady-state engine airflow. In yet another embodiment, an engine method is enabled comprising, during engine cranking, while manifold airflow is lower than a threshold, increasing throttle opening, and indicating crankcase ventilation system degradation based on a change in crankcase vent tube pressure following the throttle opening. In still another embodiment, a method for an engine is enabled comprising, indicating intake air filter degradation based on a pressure sensor in a crankcase vent tube. In a further embodiment, a method for an engine is enabled comprising, indicating degradation of a valve coupled between a crankcase and an intake manifold based on characteristics of a transient dip in crankcase vent tube pressure, during engine cranking.

Figure 2A:
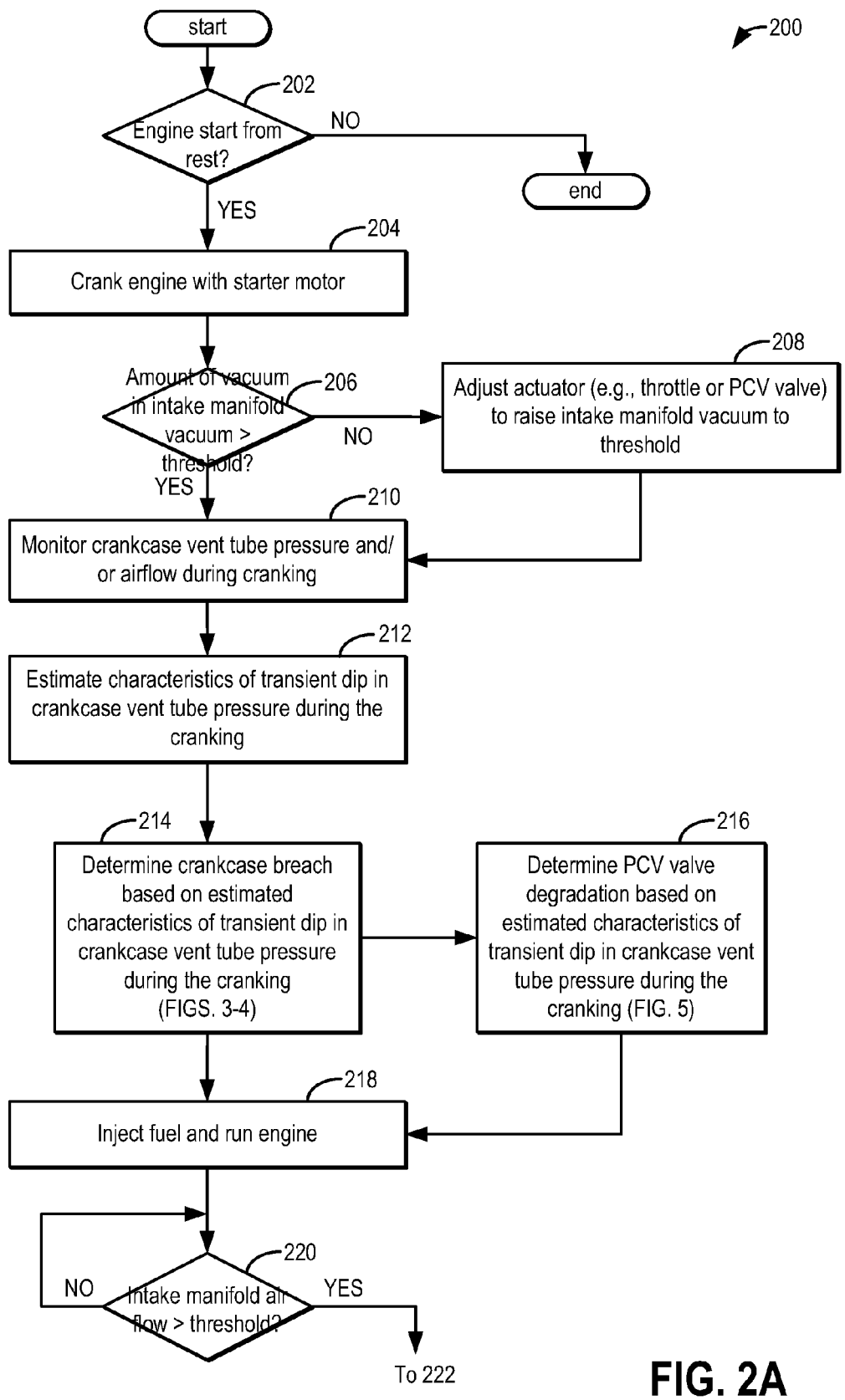
FIGS. 2A-2B show a high level flow chart for indicating degradation of one or more crankcase ventilation system components based on changes in crankcase vent tube pressure during cranking and/or engine running.
Figure 2B:
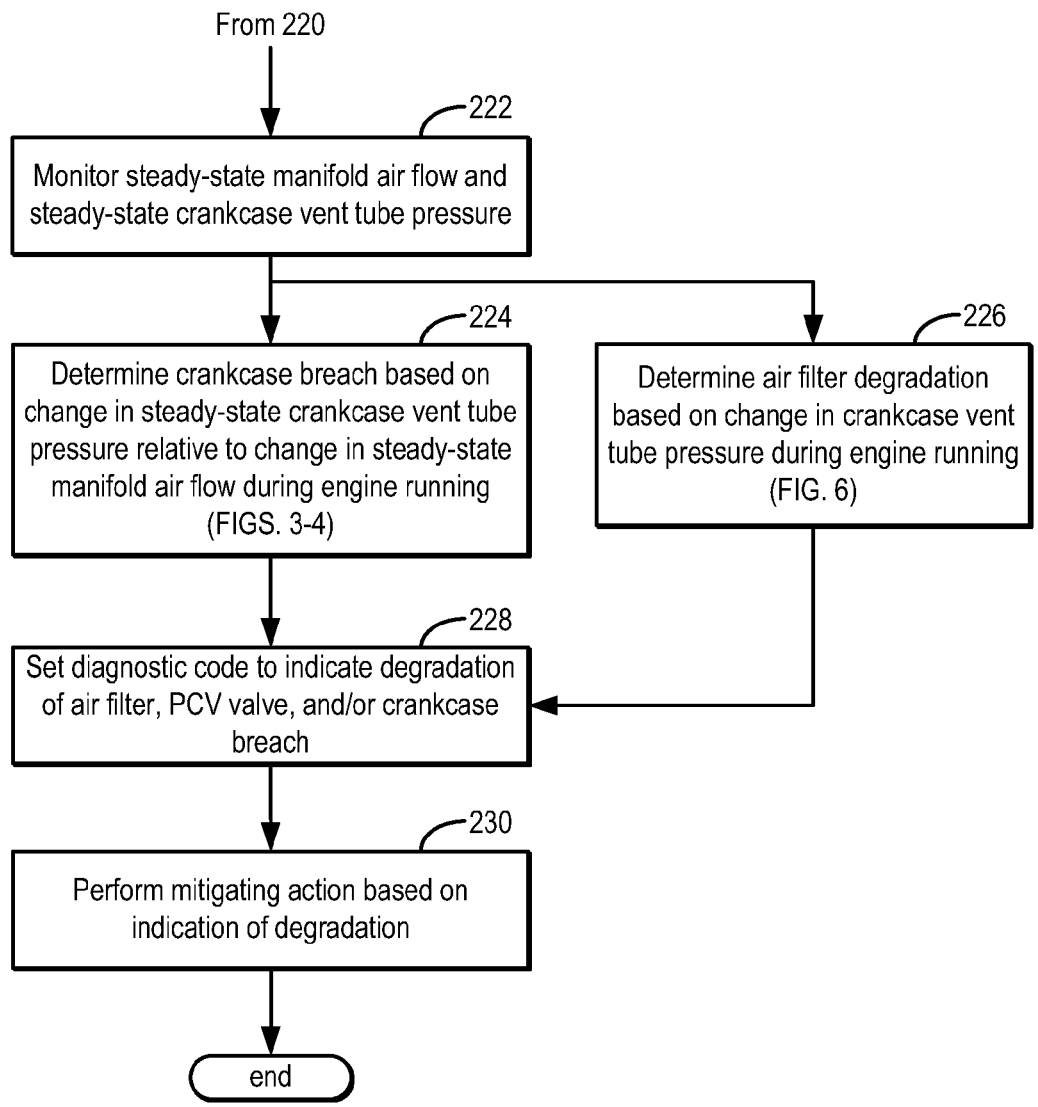

Now turning to FIGS. 2A-2B, a method 200 is illustrated for indicating degradation of one or more engine components, including crankcase ventilation system components and intake air filters, based on changes in crankcase ventilation pressure (or air flow) during engine cranking and running. By using the same sensor to detect degradation in multiple engine components, cost and component reduction benefits are achieved.

At 202, an engine start from rest may be confirmed. For example, it may be confirmed that the engine was completely stopped for a duration and the engine is being started from the state of complete rest. Upon confirmation, at 204, the engine may be started by cranking the engine with the assistance of a starter motor. Next at 206, it may be determined whether the intake manifold vacuum is higher than a threshold level. If not, then at 208, an actuator may be adjusted to raise the intake manifold vacuum to the threshold level. In one example, the actuator that is adjusted may be an intake throttle, wherein the adjusting includes increasing an opening of the throttle. In another example, the actuator that is adjusted may be a PCV valve coupled between the crankcase and the intake manifold, wherein the adjusting includes opening the PCV valve (if the valve is an on/off valve) or increasing an opening of the PCV valve (is the valve is a duty-cycle controlled valve).

As such, the PCV valve may be responsive to both the pressure drop across it and the flow rate of air through it. In particular, when it is in a low restriction position, the flow rate through the crankcase vent tube (CVT) is large. In comparison, when it is in the high restriction position (sonically limited volume flow rate), the flow rate through the CVT is fixed (neglecting the relatively small blow-by component at high ManVac). When the manifold vacuum becomes substantial enough to drive flow (e.g., 5 kPa) but not high enough to begin to cause a restriction in the PCV valve (e.g., 25 kPa), a very high CVT flow rate occurs. This high flow rate shows up as a pressure dip in the CVT pressure sensor. The presence of this dip confirms proper PCV operation and lack of crankcase breach.

Once the intake manifold vacuum is at the threshold level, from 206 or 208, the routine proceeds to 210, wherein while the engine is being cranked, and while holding the vacuum at or above the threshold vacuum level, a crankcase vent tube pressure (and/or air flow) is monitored. This includes monitoring an output of the crankcase vent tube pressure sensor during the engine cranking, while engine speed is below a threshold speed and before fuel is injected to any cylinder.

As such, during engine cranking, the intake manifold vacuum may be low such that the position of PCV valve of the crankcase ventilation system is open (e.g., the PCV valve may be maximally open, or at a maximum effective area position). This causes a large flow of air to be drawn through the intake air cleaner, then through the crankcase vent tube, then through the crankcase, into the intake manifold. This flow through the crankcase vent tube towards the intake manifold can be detected by a flow meter or venturi as a transient increase in air flow at the crankcase vent tube, or by a pressure sensor as a transient drop in crankcase vent tube pressure (or transient increase in crankcase vent tube vacuum). As the engine speed increases following cranking, and manifold vacuum increases, the air flow through the crankcase vent tube into the intake manifold may decrease. Thus, at 212, the routine includes estimating characteristics of a transient dip in crankcase vent tube pressure during the cranking. The characteristics estimated include, for example, an amplitude of the transient dip, a timing of the dip (e.g., with respect to engine speed or piston position), a duration of the dip, etc.

Next at 214, the routine includes determining and indicating crankcase ventilation system degradation based on one or more characteristics of the transient dip in crankcase vent tube pressure during engine cranking. As discussed above, during engine cranking, when manifold vacuum is lower, an increased air flow from the air filter through the crankcase vent tube towards the intake manifold is seen as a transient dip in crankcase vent tube pressure (or transient increase in vent tube vacuum or air flow). However, this transient dip may be affected by the presence of a crankcase system breach (e.g., if the vent tube is disconnected), as well as the position of the PCV valve (e.g., the PCV valve being stuck open or stuck closed). Thus, as elaborated at FIGS. 3-4, crankcase ventilation system integrity breach, as well as a location of the breach, may be indicated based at least on an amplitude of the transient dip in crankcase vent tube pressure. For example, in response to the amplitude of the transient dip being smaller than a threshold during cranking, a crankcase system breach may be determined.

Following crankcase system breach detection, the routine proceeds to 216 wherein PCV valve degradation is determined based on the characteristics of the transient pressure change at the crankcase vent tube. As elaborated at FIG. 5, this includes indicating PCV valve degradation based on an estimated profile of the crankcase vent tube pressure deviating from an expected profile during engine cranking. It will be appreciated that while the routine shows PCV valve degradation being determined after crankcase system breach is diagnosed, in alternate embodiments, the diagnostics may be performed in parallel.

After diagnosing crankcase system breach and PCV valve degradation during engine cranking, at 218, the routine includes injecting fuel to the engine cylinders and initiating a first cylinder combustion event. During the engine cranking, intake manifold air flow may be lower and as the engine speed increases (e.g., to an idling speed), the intake manifold air flow may gradually increase. The controller may then continue cylinder combustion events to enable engine run-up. At 220, it may be confirmed that the intake manifold air flow (or engine inlet air flow) is higher than a threshold air flow. As such, once the engine is at or above an idling speed, manifold air flow as well as crankcase vent tube pressure may be at steady-state levels. In particular, engine speed (along with throttle position) impacts the intake manifold pump down characteristic during crank and run up, thereby affecting a PCV valve position.

At 222, the routine includes monitoring the steady-state manifold air flow and the steady-state crankcase vent tube pressure. Then, at 224 and 226, the routine includes determining degradation of the crankcase ventilation system and degradation of an intake air filter based on the estimated change in crankcase vent tube pressure during steady-state conditions. As elaborated at FIGS. 3-4, this includes, at 224, indicating crankcase system degradation based on a change (e.g., decrease) in steady-state crankcase vent tube pressure relative to a change (e.g., increase) in the steady-state manifold air flow during engine running. As elaborated at FIG. 5, indicating air filter degradation includes, at 226, indicating a degree of air filter plugging based on a rate of change (e.g., rate of decrease) in steady-state crankcase vent tube pressure during engine running. As elaborated therein, the air filter plugging/hose collapse detection is performed during engine running since the diagnostic has maximum sensitivity at high engine air flow rates. It will be appreciated that while the routine shows air filter degradation being determined in parallel to crankcase system breach diagnosis, in alternate embodiments, the diagnostics may be performed sequentially.

At 228, after all the diagnostic routines have been performed, one or more diagnostic codes may be set to indicate degradation of the affected engine component. As such, different diagnostic codes may be set to indicate air filter plugging, crankcase system breach (including different codes to indicate the location/nature of the breach), and PCV valve degradation. At 230, the routine includes performing an appropriate mitigating action based on the indication and the diagnostic code that was set.

In one example, the controller may also record a number of crankcase breach detections to determine if a threshold number of breach detections have been reached. For example, the diagnostic routines of FIGS. 2A-2B may be rerun multiple times during a given engine operation duration including being rerun continuously from key-on until key-off, as well as during key-off. When the routine indicates a crankcase breach, the controller may store each instance of breach detection for that engine operation duration, and execute a notification routine once a threshold number of detections have been reached. The threshold may be one breach detection in some embodiments. In other embodiments, to avoid false positive tests, the threshold may be multiple breach detections, such as two, five, ten, etc. Once the threshold number of breach detections is reached, a message may be displayed to the vehicle operator, such as by activating a malfunction indicator light (MIL), to notify the operator of the vehicle of the detected crankcase breach. In addition, the operator may be prompted to check for possible breach locations (e.g., a loose or missing oil cap, or by a misaligned/loose dipstick). Alternatively, the likely location of breach (as determined at FIG. 4, elaborated below) may be indicated.

The mitigation actions may also include adjusting one or more operating parameters to prevent additional engine damage during engine operation with a breached crankcase, PCV valve or plugged filter. For example, the mitigating actions may include acting to delay a depletion of lubricant from the crankcase if the crankcase is indicated to be breached. Other example mitigating actions include reducing an intake of air into the engine, limiting a speed or torque of the engine, limiting a fuel injection amount supplied to the engine, limiting a throttle opening, limiting an amount of boost, disabling the turbocharger, and/or various other actions intended to limit an aspiration of engine lubricant from the breached crankcase. In some embodiments, the mitigation action taken may be one of a plurality of mitigating actions taken when a crankcase breach is detected. As yet another example, the plurality of mitigating actions may include adding lubricant to the crankcase or pumping lubricant from an auxiliary reservoir and into the crankcase.

In one example, in response to a crankcase vent tube being disconnected, boosted engine operation (that is, where MAP>BP) may be limited or discontinued. In another example, in response to an oil cap coming off or an oil dipstick coming out of position, an engine speed may be limited, By limiting an engine speed, oils slings may be reduced since at high engine speeds, sling oil is more likely to exit via the oil cap/dipstick than at slow engine speeds. As still another example, in response to a PCV valve being stuck shut, no failure mode action may be performed since the blow-by gas (and any entrained oil mist) is simply routed to the compressor inlet and then combusted. In an alternate example, a controller may limit engine speed by a larger amount in response to the indication of the crankcase vent tube being disconnected while limiting the engine speed by a smaller amount in response to the indication of PCV valve degradation.

Figure 3:
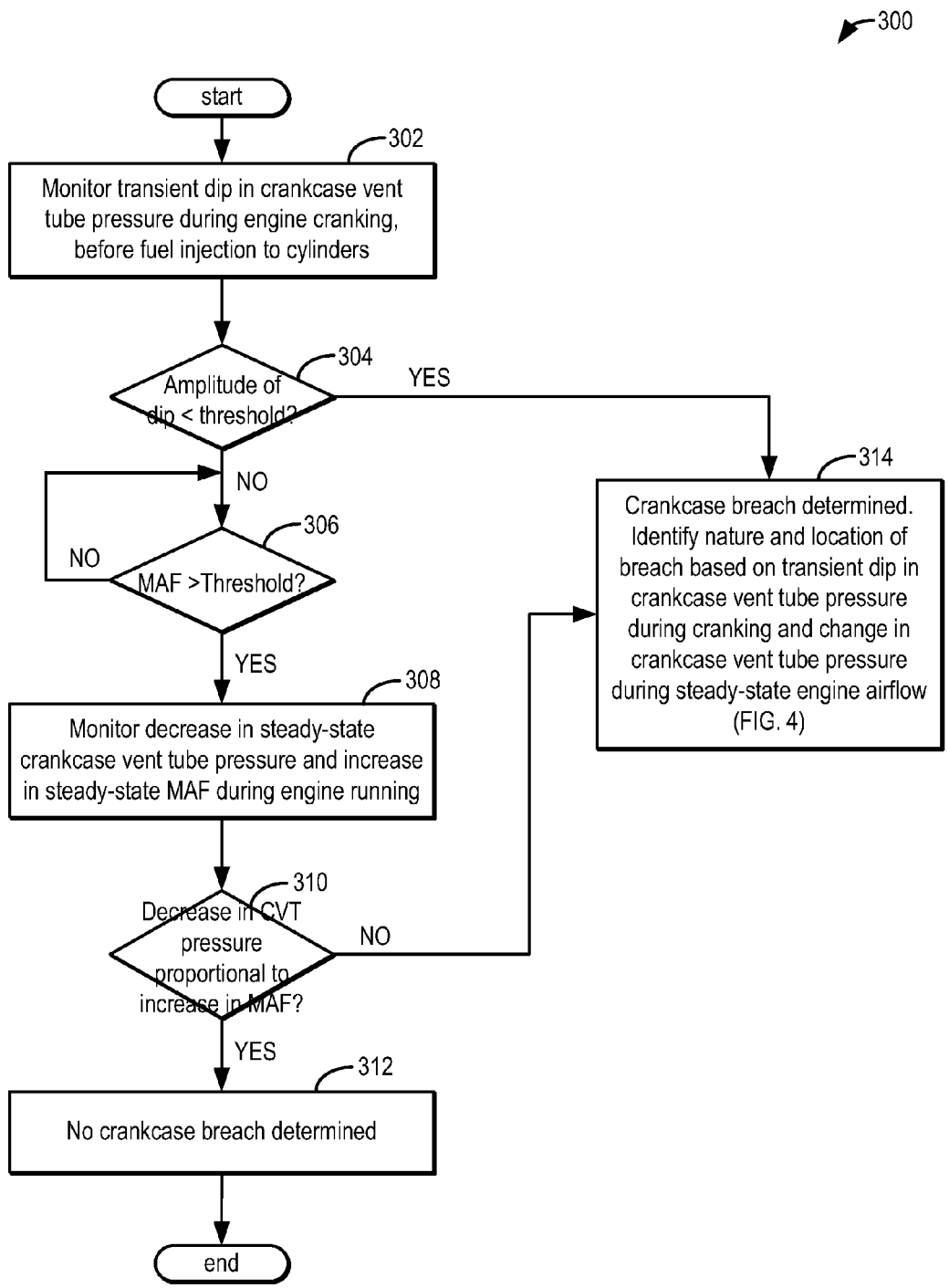
FIGS. 3-4 show example methods for indicating crankcase ventilation system breach, as well as a location of crankcase ventilation system breach, based on a transient dip in crankcase vent tube pressure during engine cranking and changes in crankcase vent tube pressure relative to changes in manifold air flow during engine running.

Now turning to FIG. 3, a method 300 is shown for indicating crankcase ventilation system degradation based on characteristics of a transient dip in crankcase vent tube pressure during engine cranking. The method further enables crankcase ventilation system degradation to be determined based on a change in crankcase vent tube pressure relative to a change in manifold air flow during engine running conditions.

The routine of FIG. 3 works on the principle that if the dip occurs (that is, if there is high CVT flow while a PCV valve is in a low restriction position) then PCV system integrity can be confirmed (with the exception of a disconnect at first side 101). A disconnect at first side 101 can be easily determined in vehicles equipped with a MAF sensor. For vehicles without a MAF sensors, the disconnect at first side 101 is detectable by the lack of pressure drop with high engine air flow at MAF sensor 58 or CVT pressure sensor 77.

At 302, the routine includes estimating a crankcase vent tube pressure during engine cranking and monitoring a transient dip in crankcase vent tube pressure during the engine cranking. The crankcase vent tube pressure may be estimated or inferred by one of a pressure sensor, a flow sensor, or a venturi coupled in the crankcase vent tube. As used herein, estimating crankcase vent tube pressure during the engine cranking includes before a first combustion event from rest. That is, before fuel injection to any engine cylinder. When the flow rate through the CVT is low, the CVT pressure sensor is effectively a static pressure sensor. It sees both the steady flow pressure drop due to flow across the air cleaner and the crankcase pressure pulsations. Tube disconnects and crankcase breaches affect the pulsation amplitude. At 304, an amplitude of the transient dip may be determined and compared relative to a threshold amplitude. In one example, the threshold amplitude may be based on manifold vacuum during the engine cranking. Herein, the threshold may be increased as the expected flow through the PCV valve changes. That is, during some condition, the threshold amplitude may increase with increasing manifold vacuum, and during other conditions, the threshold amplitude may decrease with increasing manifold vacuum.

If the amplitude of the transient dip is lower than the threshold, then at 314, the routine determines and indicates crankcase ventilation system degradation. That is, in response to insufficient air flow through the crankcase vent tube during cranking, a system breach may be determined. Indicating crankcase ventilation system degradation includes indicating that the crankcase vent tube is disconnected. For example, the crankcase vent tube may have gotten disconnected at a first side where the vent tube is mechanically coupled to the air intake passage (upstream of a compressor), or at a second, opposite side where the vent tube is mechanically coupled to the engine crankcase via an oil separator. As elaborated at FIG. 4, the controller may be configured to perform an additional routine to identify the location and nature of the breach (e.g., location of the disconnection of the vent tube) based on each of the transient dip in crankcase vent tube pressure during engine cranking (when an engine air flow is lower) and a change in steady-state crankcase vent tube pressure relative to a change in steady-state manifold air flow during engine running conditions (when the engine air flow is higher). In this way, a controller may indicate disconnection of a crankcase vent tube from an engine crankcase ventilation system based on changes in air flow through the crankcase vent tube during engine cranking and engine running.

Returning to 304, if the amplitude of the transient dip is not lower than the threshold, it may be possible that there is no crankcase system breach. To confirm this, the routine proceeds to further determine crankcase system breach during engine running conditions, after engine cranking. Specifically, at 306, it may be confirmed that manifold vacuum is higher than a threshold. That is, it may be confirmed that the engine has crossed the engine cranking state and is running at or above a defined engine speed (e.g., at or above engine idling speed) when engine air flow rate (inferred of measured) is higher. Upon confirming that manifold air flow is higher than the threshold, at 308, the routine includes monitoring a change in steady-state crankcase vent tube pressure relative to a change in steady-state manifold air flow. In particular, as the engine runs and engine speed increases, the steady-state manifold air flow may gradually increase. At the same time, in the absence of any breach, the crankcase vent tube pressure may be expected to gradually decrease (that is, an amount of vacuum generated in the crankcase vent tube may increase due to increased air flow through the crankcase vent tube).

At 310, it may be determined if the decrease in steady-state crankcase vent tube pressure (CVT) is proportional to the increase in steady-state manifold air flow during the engine running. That is, it may be determined if there is more than a threshold amount of vacuum being generated at the crankcase vent tube during engine running at high engine air flow. If the change in steady-state crankcase vent tube pressure and steady-state manifold air flow during engine running is proportional, then at 312, it may be determined that there is no crankcase ventilation system degradation, or breach. If the change is not proportional, then the routine proceeds to 314 to indicate crankcase ventilation system degradation (e.g., that the crankcase vent tube is disconnected) based on a decrease in crankcase vent tube pressure not being proportional to an increase in manifold air flow over a duration while the engine speed is at or above a threshold speed. For example, in response to reduced or no vacuum generation in the crankcase vent tube at higher engine air flows, crankcase breach is determined. As used herein, determining if the decrease in steady-state crankcase vent tube pressure (CVT) is proportional to the increase in steady-state manifold air flow during the engine running may include determining if their ratio deviates from a threshold ratio, or if their absolute difference is larger than a threshold difference.

A controller may indicate the crankcase ventilation system breach at 314 by setting a diagnostic code. Further, in response to the indication, one or more mitigating actions may be performed. These may include, for example, limiting of an engine speed and load so as to reduce/delay leaking of lubricant from the crankcase and aspiration of lubricant into engine components. Example maps used to identify crankcase system breach are illustrated herein at FIGS. 7-8.

Figure 4:
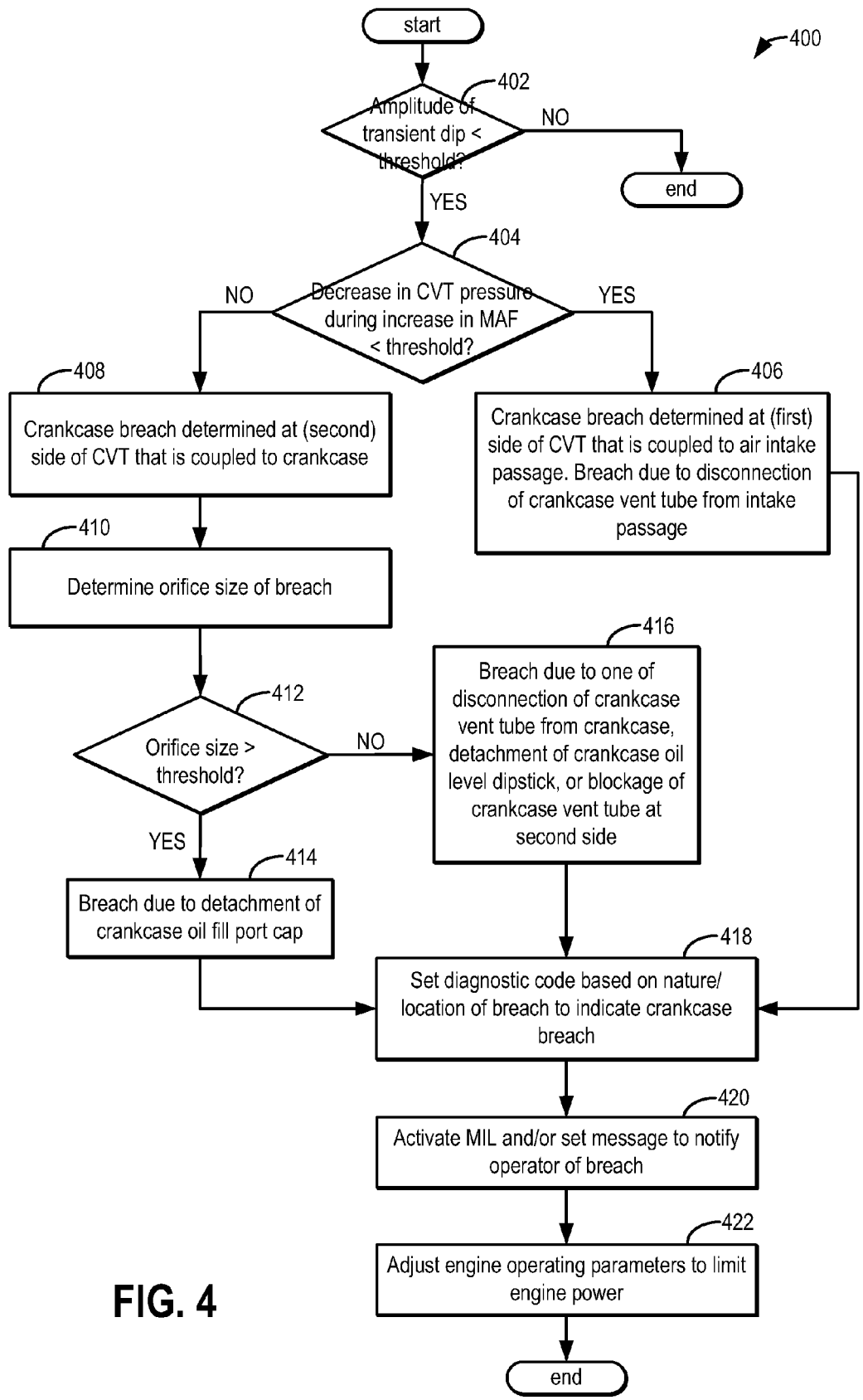

Now turning to FIG. 4, method 400 illustrates a routine that may be performed to determine a location of crankcase system breach based on each of a transient dip in crankcase vent tube pressure during cranking and a change in crankcase vent tube vacuum during and after engine run-up.

At 402, it may be confirmed that the amplitude of the transient dip in crankcase vent tube pressure at cranking is smaller than a threshold. As elaborated at FIG. 3, during engine cranking, when engine air flow is lower, a higher air flow through the crankcase vent tube may be experience (in the absence of a breach) which is detected by the crankcase vent tube pressure sensor as a transient dip in vent tube pressure (or transient increase in vent tube vacuum). If there is a breach, an amplitude of the transient tube may be reduced.

Upon confirmation, at 404, it may be determined if a ratio of the decrease in steady-state crankcase vent tube pressure (CVT) during engine running (that is, after engine cranking while engine speed is higher than a threshold) to the increase in steady-state manifold air flow during the engine running is lower than a threshold ratio. Alternatively, it may be determined if the absolute difference between them is larger than a threshold difference. As such, it may be determined if vacuum generation at the vent tube during higher engine air flows is at or below a threshold level.

In still another embodiment, if a transient dip is observed, it may be determined that the PCV system is not degraded, and the controller may then check for a disconnect at first side 101. This may be done by looking for a corrupted MAF reading and a pressure drop at the MAP sensor being too small at high engine air flow rates. Alternatively, the disconnect at the first side may be identified based on a pressure drop at the CVT pressure sensor 77 being too small at high engine air flow rates. The detection of pulsations at the CVT pressure sensor 77 may also be used.

In response to the transient dip in crankcase vent tube pressure during cranking being lower than a threshold amplitude and the decrease in steady-state crankcase vent tube pressure during the increase in steady-state manifold air flow during engine running being lower than a threshold rate, at 406, crankcase ventilation system breach may be determined at a first side of the crankcase vent tube. For example, in response to a subdued transient dip in crankcase vent tube pressure during engine cranking and substantially no crankcase vent tube vacuum (zero vacuum) generated during engine run-up, a breach is determined at the first side of the vent tube. Specifically, it may be determined that the crankcase system breach is due to the crankcase vent tube being disconnected at a first side where it is mechanically connected to an air intake passage. Example maps used to identify crankcase system breach at the first side are illustrated herein at FIG. 7.

In comparison, in response to the transient dip in crankcase vent tube pressure during cranking being lower than a threshold amplitude and the decrease in steady-state crankcase vent tube pressure during the increase in steady-state manifold air flow during engine running being higher than a threshold rate, at 408, crankcase ventilation system breach may be determined at a second side of the crankcase vent tube. For example, in response to a subdued transient dip in crankcase vent tube pressure during engine cranking and reduced crankcase vent tube vacuum generated during engine run-up, a breach is determined at the second side of the vent tube. Specifically, it may be determined that there is a crankcase system breach at a second, opposite side of the crankcase vent tube where it is mechanically connected to the crankcase. As such, crankcase system breach at the second side may include one of disconnection of the crankcase vent tube from the crankcase at the second side, detachment of a crankcase oil fill port cap, detachment of a crankcase oil level dipstick, and blockage of the crankcase vent tube at the second side.

To distinguish between the difference crankcase system breaches at the second side, the routine then proceeds to 410 wherein an orifice size of the breach is determined. In one example, an orifice size of the breach may also be determined. At 412, it may be determined if the orifice size is larger than a threshold size. If yes, then at 414, detachment of the crankcase oil fill port may be determined based on the orifice size being larger than the threshold. Else, at 416, it may be determined that the breach at the second side is due to disconnection of the crankcase vent tube from the crankcase at the second side, detachment of the crankcase oil level dipstick, or blockage of the crankcase vent tube at the second side. Example maps used to identify crankcase system breaches at the second side are illustrated herein at FIGS. 7-8.

As such, when the PCV valve is in the low restriction (fully open) position, normally large flows of air result in the crankcase vent tube. The PCV valve may be in this position due to a standard pneumatic control, active PCM control, or a PCV valve fault. This high air flow rate registers as a pressure drop or a flow rate increase at the crankcase vent tube pressure/flow rate sensor. In one example, manifold vacuum may be computed and used to infer PCV valve position. If the crankcase is breached (cap off, dipstick out of position, or crank case vent tube disconnect at crankcase) then the high air flow rate while PCV valve is open does not register. For example the pressure dip does not occur or is distinguishably reduced. The amplitude of the pressure dip or magnitude of the crankcase vent tube air flow rate also goes down as the area (orifice area or orifice size) of the breach increases. Oil cap off and hose disconnect are likely to completely eliminate the dip. Some reduced dip may also occur for a dipstick out of position.

Upon determining a location and nature of crankcase system breach at 406, 414, and 416, the routine proceeds to 418 to indicate the location and nature of crankcase system breach by setting a diagnostic code. As such, a different diagnostic code may be set based on whether breach is detected at the first side or the second side of the crankcase vent tube, and further based on the nature of the breach at the second side. At 420, an MIL may be illuminated and/or a message may be set to notify the vehicle operator about the nature and location of the crankcase system breach. At 422, one or more engine operating parameters may be adjusted to temporarily limit engine power so as to reduce leakage of lubricant from the breached crankcase ventilation system and aspiration of lubricant into engine components (which can degrade engine operation).

As such, if the crankcase vent tube is disconnected at the main engine air duct (that is, at the compressor inlet, herein also referred to as the first side) the high air flow rate during PCV valve fully open will still be detected. In one example, in response to the indication of a breach located on the first side of the crankcase vent tube, or a breach located on the second side of the crankcase vent tube, an engine control system may limit an engine boost. For example, boosted engine operation may be discontinued.

Figure 7:
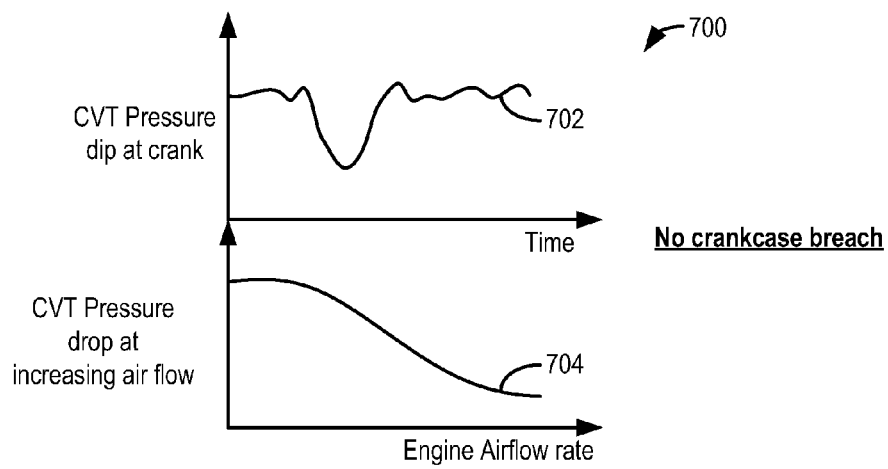
FIGS. 7-8 shows example changes in crankcase vent tube pressure that may be used to indicate a crankcase breach and identify a location of the breach.
Figure 7:
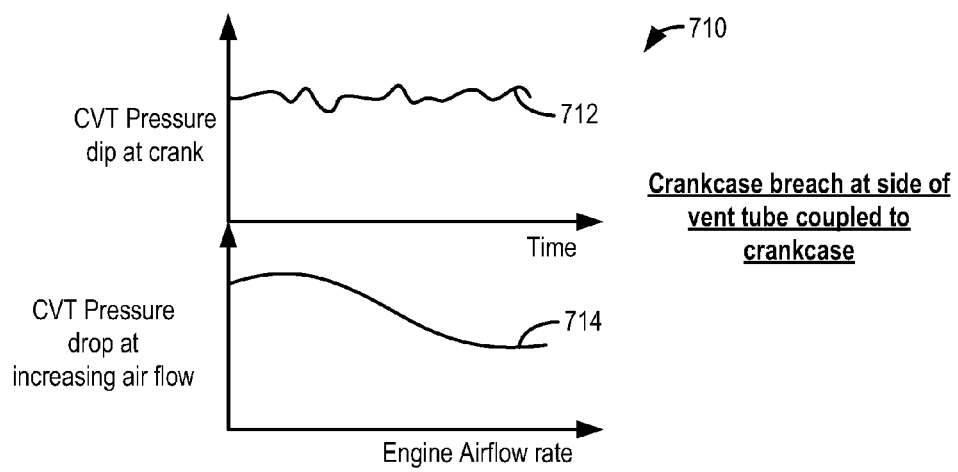
Figure 7:
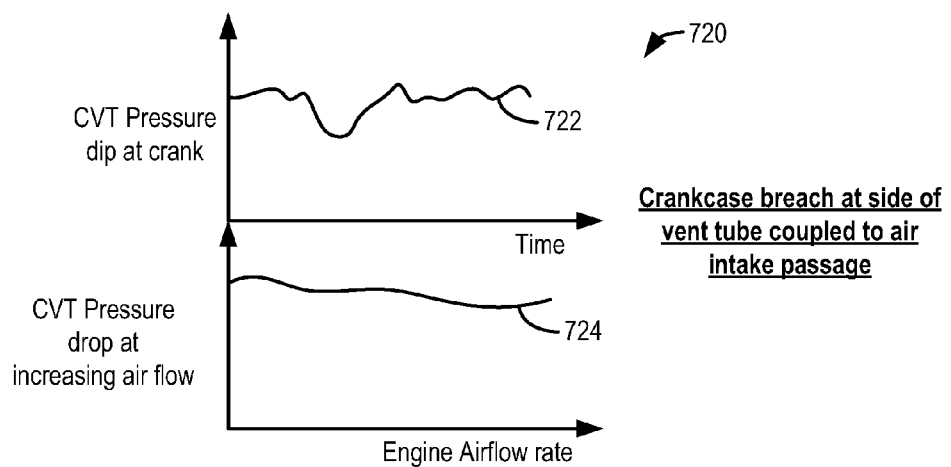

Now turning to FIG. 7, an example crankcase system integrity breach diagnostic is shown at maps 700, 710, and 720. Specifically, maps 700-720 show characteristics of a transient dip in crankcase vent tube (CVT) pressure during cranking at the respective upper plots (plots 702, 712, 722) and characteristics of a drop in crankcase vent tube pressure with increasing manifold air flow during engine running (steady-state conditions) at the respective lower plots (plots 704, 714, 724). The upper plots of the maps are plotted over time of engine operation while the lower plots of the maps are plotted over engine air flow rate (as depicted) along the x-axis.

As elaborated previously, the plumbing arrangement of the crankcase vent tube as well as the specific location of the crankcase vent tube pressure sensor within the tube cause the crankcase vent tube to go to a vacuum at high engine air flow rates. Thus, if the sensor detects the vacuum, it may be determined that there is no breach and that the vent tube is correctly attached. However, if a vacuum is not detected, a breach in crankcase system integrity is determined. As such, disconnection of the vent tube at either side (at a first side where it is connected to the air intake passage or a second side where it is connected to the crankcase) may result in reduced vacuum at high engine flow rates (with the degree of reduction in vacuum differing based on whether the breach is at the first or second side). In addition, when disconnected at the second side, crankcase pulsations may not be sensed.

Map 700 shows a first example wherein the amplitude of the transient dip in CVT pressure (plot 702) is greater than a threshold amount, indicating sufficient air flow through the vent tube during engine cranking. In addition, during engine running, a decrease in steady-state CVT pressure is proportional to an increase in steady-state manifold air flow (plot 704). In other words, as an engine air flow increases, a smaller but gradual flow passes through the vent tube, and a corresponding vacuum is generated and sensed by a pressure or flow sensor in the crankcase vent tube.

Map 710 shows a second example wherein the amplitude of the transient dip in CVT pressure (plot 712) is smaller than the threshold amount, indicating insufficient air flow through the vent tube during engine cranking. In addition, during engine running, a decrease in steady-state CVT pressure is not proportional to an increase in steady-state manifold air flow, but the decrease is still more than a threshold rate (plot 714). Specifically, reduced vacuum is sensed by a pressure or flow sensor in the crankcase vent tube during high engine air flow conditions (as compared to vacuum generated in the absence of a breach, as shown at plot 704). Herein, in response to the transient dip in crankcase vent tube pressure during cranking being lower than the threshold amplitude and the decrease in crankcase vent tube pressure during the steady-state increase in manifold airflow being higher than the threshold rate, crankcase ventilation system breach at a second side of the crankcase vent tube is indicated. The second side corresponds to a side where the crankcase vent tube is mechanically coupled to the crankcase. As elaborated at FIG. 8, various crankcase system breaches at the second side can be further distinguished based on crankcase vent tube pressure and flow characteristics.

Map 720 shows a third example wherein the amplitude of the transient dip in CVT pressure (plot 722) is smaller than the threshold amount (in the depicted example, smaller than the amplitude of plot 702 but larger than the amplitude of plot 712), indicating insufficient air flow through the vent tube during engine cranking. In addition, during engine running, a decrease in steady-state CVT pressure is not proportional to an increase in steady-state manifold air flow, with the decrease being less than a threshold rate (plot 724). Specifically, substantially no vacuum (zero vacuum) is sensed by a pressure or flow sensor in the crankcase vent tube during high engine air flow conditions (as compared to vacuum generated in the absence of a breach, as shown at plot 704). Herein, in response to the transient dip in crankcase vent tube pressure during cranking being lower than the threshold amplitude and the decrease in crankcase vent tube pressure during the steady-state increase in manifold airflow being lower than the threshold rate, crankcase ventilation system breach at a first side of the crankcase vent tube is indicated. The first side corresponds to a side where the crankcase vent tube is mechanically coupled to the air intake passage. For example, it may be indicated that the breach at the first side is due to the crankcase vent tube being disconnected from the air intake passage at the first side.

Figure 8:
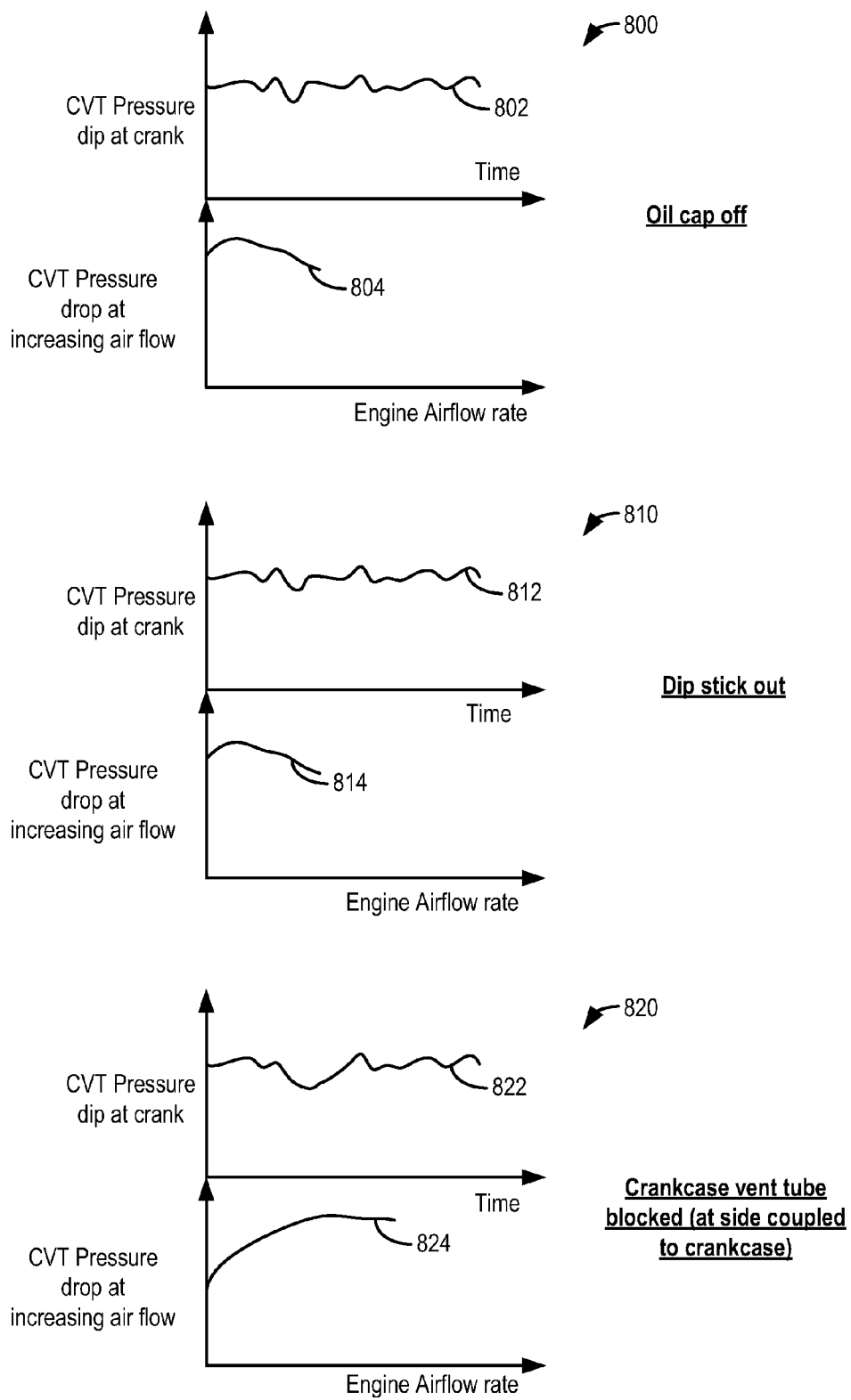

Now turning to FIG. 8, an example crankcase system integrity breach diagnostic is shown at maps 800, 810, and 820 for differentiating between different conditions that may lead to a breach identified at the second side of the crankcase vent tube. Specifically, maps 800-820 show characteristics of a transient dip in crankcase vent tube (CVT) pressure during cranking at the respective upper plots (plots 802, 812, 822) and characteristics of a drop in crankcase vent tube pressure with increasing manifold air flow during engine running (steady-state conditions) at the respective lower plots (plots 804, 814, 824). All upper plots are shown over time of engine operation along the x-axis while all lower plots are shown over engine airflow rates along the x-axis.

Map 800 shows a first example of a crankcase system breach at the second side of the crankcase vent tube caused by a crankcase oil fill port cap coming off. Herein, an amplitude of the transient dip in CVT pressure (plot 802) is smaller than the threshold amount, indicating insufficient air flow through the vent tube during engine cranking. In addition, during engine running, a decrease in steady-state CVT pressure is not proportional to an increase in steady-state manifold air flow. Specifically, no vacuum is sensed by a pressure or flow sensor in the crankcase vent tube after a threshold engine air flow level (plot 804). Herein, further based on an orifice size of the breach being larger than a threshold amount, an oil cap off condition is indicated.

Map 810 shows a second example of a crankcase system breach at the second side of the crankcase vent tube caused by a crankcase oil level dipstick being dislodged. Herein, an amplitude of the transient dip in CVT pressure (plot 812) is smaller than the threshold amount, indicating insufficient air flow through the vent tube during engine cranking. In addition, during engine running, a decrease in steady-state CVT pressure is not proportional to an increase in steady-state manifold air flow (plot 814). Specifically, no vacuum is sensed by a pressure or flow sensor in the crankcase vent tube during high engine air flow conditions. Herein, further based on an orifice size of the breach being smaller than a threshold amount, a dipstick out condition is indicated.

It will be appreciated that in embodiments where the crankcase vent tube includes a venturi with a coupled pressure sensor, in response to an oil cap coming off or a dipstick being out of position, a large resulting air flow through the venturi can be sensed as a deep vacuum by the coupled pressure sensor. As such, the vacuum generated due to an oil cap coming off may be more than the vacuum generated due to the dipstick being out of position.

Map 820 shows a third example of a crankcase system breach at the second side of the crankcase vent tube caused by the crankcase vent tube being blocked or clogged at the second side. Herein, an amplitude of the transient dip in CVT pressure (plot 822) is smaller than the threshold amount, indicating insufficient air flow through the vent tube during engine cranking. In addition, during engine running, an increase in steady-state CVT pressure is observed during an increase in steady-state manifold air flow. Specifically, high (positive) pressure is sensed by a pressure or flow sensor in the crankcase vent tube during high engine air flow conditions. In response to these conditions, clogging of the crankcase vent tube at the second side (coupled to the crankcase) is determined.

In this way, an existing sensor used for crankcase ventilation system monitoring can be advantageously used to also reliably identify a location and nature of crankcase system integrity breach.

Now turning to FIG. 5, an example method 500 is shown for indicating degradation of a PCV valve (that is, a valve coupled in a positive crankcase ventilation line between a crankcase and an intake manifold) based on changes in crankcase vent tube pressure and/or air flow rate during engine cranking. As such, the routine of FIG. 5 may be performed after confirming whether a crankcase breach has been determined based on characteristics of the transient dip.

As such, the method of FIG. 5 evaluates the PCV flow characteristics during engine running (or during a service procedure) given that both the pressure drop across the PCV valve (manvac) and the flow rate through the valve (CVT flow rate) are measured by the CVT pressure sensor). In some embodiments of FIG. 5, the method may simply verify CVT flow rates at given manvacs. Therein, at the most restricted PCV valve position, the CVT flow rate will be substantially low such that it is in the noise. At the least restrict flow rate position, the flow rate will be significant (that is, a transient dip will be seen).

At 502, the routine includes confirming that engine inlet air flow is lower than a threshold flow. In one example, engine inlet air flow may be lower than the threshold flow during engine cranking and early run up when engine speed is lower than a threshold speed and before a threshold number of combustion events have occurred. Next, at 504, it may be confirmed that manifold vacuum is lower than a threshold vacuum level. For example, it may be confirmed that manifold vacuum is less than 40 kPa. If manifold vacuum is not lower than the threshold, then at 505, an actuator may be adjusted to provide a desired manifold vacuum level. For example, a throttle opening may be adjusted so as to hold the manifold vacuum below the threshold vacuum level. As such, since throttle opening is related to flow rate through a PCV valve, the throttle opening may be adjusted to provide a manifold vacuum level (e.g., 13 kPa) so as to provide maximal flow through the PCV valve.

The routine of FIG. 5 uses the output of a crankcase vent tube pressure sensor to estimate PCV valve degradation. Specifically, a gauge pressure sensor in the crankcase vent tube may be advantageously used as a flow meter to sense changes in air flow rate in the crankcase vent tube. However, such a pressure sensor may correlate any vacuum in the crankcase vent tube as a flow. In other words, a flow through the crankcase vent tube may be sensed as a vacuum at the crankcase vent tube pressure sensor, and likewise, a vacuum in the crankcase vent tube may also be sensed as a vacuum at the crankcase vent tube pressure sensor. Thus, by performing the diagnostic routine when engine inlet air flow is lower than a threshold flow, a crankcase vent tube pressure sensor output is relied on only during conditions when the engine inlet air flow is itself not causing a vacuum to be sensed. Likewise, by performing the diagnostic routine when manifold vacuum is lower than a threshold vacuum level, a crankcase vent tube pressure sensor output is relied on only during conditions when the manifold vacuum is itself not causing a vacuum to be sensed. In addition, during conditions when engine inlet air flow is low and manifold vacuum is low (that is, during engine cranking and early run-up), an air flow rate through the crankcase vent tube is expected to be high. Thus, by performing the diagnostics during those conditions, PCV valve diagnostics that are based on changes in crankcase vent tube air flow are enabled only when there is sufficient air flow through the vent tube for a reliable diagnosis.

At 506, the routine includes determining an expected crankcase vent tube pressure and/or air flow profile based on current engine inlet air flow and manifold vacuum levels. The expected profiles may include an expected vent tube pressure and expected vent tube flow rate for a given engine speed. At 508, the routine includes estimating an actual crankcase vent tube pressure and/or air flow profile based on the output of the crankcase vent tube pressure sensor. It will be appreciated that in alternate embodiments, the estimated profile may be based on the output of a dedicated crankcase vent tube flow sensor or a pressure sensor coupled to the neck of a crankcase vent tube venturi. The estimated profiles may include a measured and/or inferred vent tube pressure and measured and/or inferred vent tube flow rate for the given engine speed.

As such, during engine cranking, and the subsequent run-up, the PCV valve is first in a more open position (e.g., at a maximally open position when manifold vacuum is lower and throttle opening is small). During these conditions, air flow through the crankcase vent tube is substantially higher, and can be estimated by the crankcase vent tube pressure/flow sensor as a transient increase in vent tube air flow or a transient decrease in vent tube pressure. Then, when engine speed is above a threshold, and manifold vacuum is higher, the PCV valve may be in a second, less open position (e.g., at a smaller fixed orifice position enabling lower flow). For example, at the second position, flow through the PCV valve may be controlled to a sonic choked hole. During these conditions, air flow through the crankcase vent tube drops and stabilizes to a steady-state, which can also be estimated by the crankcase vent tube pressure/flow sensor. If a PCV valve is stuck open, the crankcase vent tube air flow may continue to rise at the higher manifold vacuum conditions instead of dropping and stabilizing at the steady-state value. Likewise, if the PCV valve is stuck in the small orifice position during cranking, the crankcase vent tube air flow may not rise to the expected values during the lower manifold vacuum conditions. Thus, by comparing the characteristic changes in an expected flow/pressure profile of a crankcase vent tube pressure to the actual changes in a crankcase vent tube flow/pressure profile as estimated by a crankcase vent tube pressure/flow sensor, PCV valve degradation can be identified.

Accordingly, at 510, the measured or estimated crankcase vent tube pressure profile and/or air flow profile may be compared to the expected crankcase vent tube pressure profile and/or air flow profile and it may be determined if an absolute difference between the profiles is larger than a threshold. That is, it may be determined if the expected and actual crankcase vent tube pressure values or flow rates deviate from each other by more than a threshold amount. If not, then at 512, the routine determines that there is no PCV valve degradation.

If there is a deviation, then at 514, it is determined that the PCV valve may be degraded and the routine may proceed to determine the nature of the degradation based on characteristics of the estimated crankcase vent tube pressure and/or flow rate profiles. In particular, at 516, it may be determined if the estimated crankcase vent tube pressure or air flow rate is greater than the expected crankcase vent tube pressure (or air flow rate) by more than the threshold amount. Alternatively, it may be determined if an estimated amplitude of a transient dip in crankcase vent tube pressure is higher than an expected amplitude (or threshold amplitude). If yes, then at 518, it may be determined than the estimated crankcase vent tube pressure/air flow profile is greater than the expected profile (or that the amplitude of the transient dip in crankcase vent tube pressure is higher than an expected amplitude) due to the PCV valve being stuck in the open position. The controller may indicate the same by setting an appropriate diagnostic code.

If the estimated crankcase vent tube pressure or air flow rate is not greater than the expected crankcase vent tube pressure (or air flow rate), then it may be confirmed that the estimated crankcase vent tube pressure or air flow rate is smaller than the expected crankcase vent tube pressure (or air flow rate) by more than the threshold amount. Alternatively, it may be determined if an estimated amplitude of a transient dip in crankcase vent tube pressure is lower than an expected amplitude (or threshold amplitude). Upon confirmation, at 522, it may be determined if a condition of crankcase breach has already been determined. As previously elaborated with reference to FIGS. 2A-2B, a crankcase ventilation system integrity breach may have been determined before initiating the PCV valve diagnostic routine of FIG. 5. As explained with reference to FIGS. 3-4, a breach in crankcase ventilation system integrity, as well as a location of the breach may be determined based on characteristics of a transient dip in crankcase vent tube pressure during engine cranking, as well as a change in steady-state crankcase vent tube pressure relative to a change in steady state manifold air flow during engine running.

As such, if there is a breach in the crankcase system integrity, there may be a change in one or more of the crankcase vent tube pressure and flow rate, either of which may have an effect on the crankcase vent tube pressure/flow sensor output, and resulting profile during engine cranking and run-up. In addition, the profile is affected by the location of the crankcase breach. For example, crankcase system breaches occurring on the second side of the crankcase vent tube (that is, the side of the crankcase vent tube that is coupled to the crankcase) may cause the crankcase vent tube flow rate to be substantially reduced due to the breach causing a short circuit in the expected flow rate. In addition, the crankcase vent tube pressure sensor may no longer show a vacuum at high engine air flow rates (as compared to the vacuum shown at high engine air flow rates in the absence of a breach). Breaches on the second side of the vent tube that may cause these effects include, for example, disconnection of the vent tube from the crankcase at the second side, a crankcase oil fill port cap coming off, or a crankcase oil level dipstick being displaced. As another example, crankcase system breaches occurring on the first side of the crankcase vent tube (that is, the side of the crankcase vent tube that is coupled to the air intake passage) may cause the crankcase vent tube flow rate to be substantially unaffected, however, the crankcase vent tube pressure sensor may no longer show a vacuum at high engine air flow rates (as compared to the vacuum shown at high engine air flow rates in the absence of a breach). Breaches on the first side of the vent tube that may cause these effects include, for example, disconnection of the vent tube from the air intake passage at the first side.

Accordingly, if no crankcase breach has been previously determined, at 524, the routine determines that the estimated crankcase vent tube pressure/air flow profile is smaller than the expected profile (or that the amplitude of the transient dip in crankcase vent tube pressure is smaller than an expected amplitude) due to the PCV valve being stuck in a low flow open position (e.g., in a small orifice position or a closed position). The controller may indicate the same by setting an appropriate diagnostic code. As such, the diagnostic code set to indicate PCV valve degradation due to the valve being stuck open (at 518) may be distinct from the diagnostic code set to indicate PCV valve degradation due to the valve being stuck closed (at 524). If crankcase breach was previously determined, at 526, the controller may determine that the PCV valve may be functional and not degraded.

It will be appreciated that in some embodiments, in addition to confirming if crankcase system breach was determined at 522, it may also be determined if an air intake filter was diagnosed and if so, a degree of air filter clogging may be factored into the PCV valve diagnostic. As elaborated at FIG. 10, if air filter plugging is confirmed, then at 524, the deviation between the expected profile and the estimated profile may be due to the air filter being clogged rather than the PCV valve being stuck in the low flow position. The controller may distinguish between these conditions based on the (known) degree of filter plugging in relation to the observed deviation between the estimated and expected crankcase vent tube flow rate profiles. For example, if the deviation is more than that expected factoring in the degree of filter plugging, crankcase system breach may be determined.

In this way, PCV valve degradation may be determined based on changes in air flow rate through a crankcase vent tube, as estimated by a crankcase vent tube pressure or flow sensor, during engine cranking. Based on deviations of an expected flow profile from an estimated flow profile, PCV valve degradation due to a stuck open valve may be better distinguished from degradation due to a stuck closed valve. By performing the PCV valve diagnostic routine after completing a crankcase system breach diagnostic routine, changes in crankcase vent tube pressure or flow caused due to a crankcase system breach at either a crankcase side or an air intake passage side of the crankcase vent tube can be factored in to enable a reliable PCV valve diagnostic. In particular, changes in crankcase vent tube air flow due to a crankcase system breach (e.g., due to a disconnected vent tube or a displace oil fill port cap) can be better distinguished from those due to a degraded PCV valve.

In one example, in response to the PCV valve being stuck open (or in the high flow position), an engine boost may be limited so that MAP is below BP. As such, a stuck open PCV valve results in crankcase gasses and oil mist being blown into the inlet of the compressor. This leads to a rapid oil consumption risk which can be reduced by limiting (or discontinuing) boost. In comparison, a stuck closed PCV valve results in essentially a stale air crankcase ventilation system. Over a long term, this result in engine sludge formation in the oiled portions of the engine. Thus, no mitigating action may be needed. Alternatively, in response to the PCV valve being stuck closed (or in the low flow position), an engine speed may be limited.

It will be appreciated that while the routine of FIG. 5 is depicted as being performed while an engine is cranking, in alternate embodiments, such as in embodiments where the engine is coupled in a hybrid vehicle system, or in engine start/stop systems where the engine is configured to be selectively deactivated responsive to idle-stop conditions, the routine of FIG. 5 may also be performed during key-off conditions (that is, where a vehicle operator has turned an ignition key to an off position). For example, during a vehicle key-off condition, a controller may close an intake throttle and perform a vacuum decay test with the PCV valve in any given position. PCV valve degradation may then be determined based on the rate of vacuum decay from the crankcase vent tube.

An example PCV valve diagnostic is illustrated at map 1000 of FIG. 10. Specifically, map 1000 shows changes in crankcase vent tube air flow rate along the y-axis and changes in manifold vacuum along the x-axis. Plots 1002-1008 depict example changes in vent tube flow rate relative to manifold vacuum used for diagnosing a PCV valve.

Plot 1002 depicts a first plot of expected change in crankcase vent tube air flow rate during engine cranking and run-up. As previously elaborated, during engine cranking, when manifold vacuum is low (and throttle opening is small), the PCV valve may be in an open position causing a large amount of air to be directed from an intake air filter, through the crankcase vent tube, via the crankcase, into the intake manifold. As a result, at low manifold vacuum levels (e.g., at or around 13 kPa), a substantially high rate of air flow through the crankcase vent tube may be seen. Then, as the engine proceeds from cranking into run-up, a throttle opening may increase, a PCV valve opening may decrease (e.g., to a fixed smaller orifice position or a low flow position), a manifold vacuum may increase (e.g., above 13 kPa), and air flow into and through the crankcase vent tube may decrease, causing a drop and eventually stabilizing of crankcase vent tube air flow rate.

Plot 1004 shows a second plot of an estimated change in crankcase vent tube air flow rate during engine cranking and run-up in the presence of a stuck open PCV valve. Herein, as the engine proceeds from cranking into run-up, the PCV valve opening does not decrease, as expected to, due to the PCV valve being stuck open. Consequently, as the manifold vacuum increases, air flow into and through the crankcase vent tube may continue to increase, causing the estimated crankcase vent tube air flow rate and profile (plot 1004) to be higher than the expected air flow rate and profile (plot 1002).

Plot 1006 shows a third plot of an estimated change in crankcase vent tube air flow rate during engine cranking and run-up in the presence of a PCV valve that is stuck in a low flow position. Herein, during engine cranking, the PCV valve may not be able to open to the fully open position causing a substantially smaller amount of air to be directed from the intake air filter, through the crankcase vent tube, via the crankcase, into the intake manifold. As a result, at low manifold vacuum levels, a substantially smaller rate of air flow through the crankcase vent tube may be seen, causing the estimated crankcase vent tube air flow rate and profile (plot 1006) to be lower than the expected air flow rate and profile (plot 1002).

Plot 1008 shows a fourth plot of an estimated change in crankcase vent tube air flow rate during engine cranking and run-up in the presence of a functional PCV valve and an air filter that is fully clogged. Herein, as at plot 1006, during engine cranking, even though the PCV valve is open, air flow from the intake air filter, through the crankcase vent tube, via the crankcase, into the intake manifold, may be reduced due to the clogged air filter. As a result, at low manifold vacuum levels, a substantially smaller rate of air flow through the crankcase vent tube may be seen, causing the estimated crankcase vent tube air flow rate and profile (plot 1006) to be lower than the expected air flow rate and profile (plot 1002).

In one example, plot 1002 is observed if the PCV valve is not degraded, plot 1004 is observed if the PCV valve is stuck in a low restriction position, plot 1006 is observed if the PCV valve is stuck in a high restriction position, and plot 1008 is observed if the air filter is clogged or frozen shut.

It will be appreciated that while the example of FIG. 10 illustrates determining PCV valve degradation based on deviations in an estimated vent tube air flow rate profile from an expected air flow rate profile, in alternate example, the same may be determined (or illustrated as) deviations in an estimated vent tube vacuum profile from an expected vacuum profile. In this way, an existing sensor used for crankcase ventilation system monitoring can be advantageously used to also reliably diagnose a PCV valve.

Now turning to FIG. 6, an example method 600 is shown for indicating degradation of an intake air filter based on crankcase vent tube pressure estimated by a pressure sensor in the crankcase vent tube. As such, the routine of FIG. 6 may be performed as part of the routine of FIGS. 2A-2B.

At 602, the routine includes confirming whether manifold air flow is lower than a first threshold. By confirming that manifold air flow is lower than the first threshold, it may be confirmed that a sensor offset is calculated during low engine flow conditions (such as during no engine flow) so as to reduce noise disturbances arising in the calculation from engine flow. Next, at 604, a crankcase vent tube pressure may be estimated during the low manifold air flow conditions by a pressure sensor positioned in the crankcase vent tube. The pressure sensor in the crankcase vent tube may be, for example, an absolute pressure sensor or a gauge pressure sensor. In embodiments where the pressure sensor is an absolute pressure sensor, it may or may not be coupled to a barometric pressure sensor. In embodiments where the pressure sensor is a gauge sensor, an absolute barometric pressure sensor (e.g., BP sensor 57 of FIG. 1) may be coupled to it (e.g., additionally present outside of the filtered volume) or used in conjunction.

At 606, the routine includes calculating a sensor offset. Specifically, the algorithm used zeroes the gauge pressure sensor during low engine flows, or learns a sensor offset based on the barometric pressure reading from the BP sensor at low engine flow conditions. In this way, the controller effectively learns or infers the barometric pressure from the crankcase vent tube pressure sensor and can either use the output of the crankcase vent tube pressure sensor at low engine flow as barometric pressure itself, or can use the output to ensure common and calibrated reference to a barometric pressure that is separately sensed. In one example, barometric pressure may be separately learned from a dedicated barometric pressure sensor coupled to the intake passage (e.g., upstream of the air filter), or from a compressor inlet pressure sensor (CIP sensor) positioned in the intake upstream of the compressor and downstream of the air filter. However, by using the existing crankcase vent tube pressure sensor to estimate BP, the need for a dedicated BP sensor or a CIP sensor is reduced.

In one example, the pressure sensor in the crankcase vent tube is a first pressure sensor and the offset is determined based on a second pressure sensor (e.g., BP sensor) coupled downstream of the air filter and upstream of the compressor. Specifically, the offset may be based on the output of the first pressure sensor relative to the output of the second pressure sensor during low manifold air flow conditions. For example, when the first pressure sensor is an absolute pressure sensor without a BP sensor, the output of the first pressure sensor may be used to infer BP. As another example, when the first pressure sensor is an absolute pressure sensor with a BP sensor, the difference between the outputs of the first pressure sensor and the coupled BP sensor may be used to infer BP and learn a sensor offset. As still another example, when the first pressure sensor is a gauge pressure sensor, the difference of the first pressure sensor from a zero reading may be used to infer BP and calculate a sensor offset.

The calculated offset may then be stored in the controller's memory as a reference pressure. The stored offset may then be retrieved and applied during subsequent higher engine flow conditions to determine air filter plugging, as elaborated below.

Next, at 608, it may be determined if engine air flow (or any other signal related to engine air flow rate) is higher than a second threshold. By confirming that engine air flow is higher than the second threshold, it may be confirmed that air filter plugging is estimated during higher engine flow conditions, when the effect of air filter plugging on crankcase vent tube pressure is greater, so as to improve detection accuracy. If the engine air flow is not higher than the second threshold, the routine may wait until the desired engine air flow levels are reached to perform the air filter plugging diagnosis. At 610, upon confirming that manifold air flow levels are higher than the second threshold, it may be confirmed that the sensor offset has been updated. This may include confirming that the sensor offset that was learned during the lower engine flow conditions immediately preceding the higher engine flow conditions has been stored in the controller (e.g., a look-up table has been updated with the most recently learned offset).

At 612, upon confirming that the offset has been updated, the sensor output(s) may be adjusted based on the updated offset. This includes adjusting the output of the crankcase vent tube pressure sensor with the updated offset. At 614, it may be determined if the deviation between the adjusted sensor output and an estimated/inferred BP is higher than a threshold. In one example, the deviation may be based on the difference between the sensors. In another example, the deviation is based on a ratio between the sensor outputs. If the difference is not higher than the threshold amount, then at 616, it may be determined that the air filter is clean and is not plugged. In comparison, if the difference is higher than the threshold amount, then at 618, air filter plugging may be indicated. A degree of air filter plugging may be determined based on the difference between the adjusted sensor output and BP (e.g., relative to the threshold).

In an alternate example, a difference between the crankcase vent tube pressure reading at high air flow (which is substantially equal to CIP) and the reference pressure estimated at low air flow may be calculated. Then, a reference air filter delta pressure may be retrieved from a look-up table. The controller may then compensate the reference air filter delta pressure for actual conditions and calculate a plug factor from the ratio of delta CIP over compensated reference delta pressure. That is, the controller may estimate an instantaneous air filter plugging factor based on a ratio of the difference between the crankcase vent tube pressures estimated during high and low air flow conditions relative to a reference air filter drop, with a correction for non-standard temperature and pressure (STP). In one example, STP conditions include 103 kPa and 100° F. As an example, the controller may estimate the plugging factor using the following equation:

$$\text{Instantaneous Plugging Factor} = \frac{BP - \text{Offset} - CVP \text{ sensor reading}}{F(\text{airflow at conditions}) * F(BP, IAT)} * F(\text{Airflow}),$$

wherein the plugging factor is determined in reference to standard conditions (STP). At 620, the controller may set a diagnostic code to indicate air filter plugging. As such, the diagnostic code for indicating air filter plugging may be distinct from a diagnostic code used to indicate crankcase ventilation system breach/degradation. The controller may also illuminate an MIL light notifying the vehicle operator to service the air filter. The controller may also limit engine power so as to reduce compressor over-speeding and overheating that may be caused due to the plugged air filter.

In this way, by indicating air filter degradation based on crankcase vent tube pressure, monitoring of both crankcase system integrity as well as air filter plugging can be performed using a single sensor set already existing in the crankcase vent tube.

An example air filter plugging diagnostic is illustrated at map 900 of FIG. 9. Specifically, map 900 shows changes in crankcase vent tube pressure along the y-axis and changes in manifold air flow along the x-axis. Plots 902-906 depict example changes in vent tube pressure relative to manifold air flow used for indicating a state of an intake air filter.

During low engine air flow conditions, such as before manifold airflow is at a first threshold AF1, an offset for the crankcase vent tube pressure sensor may be learned. For example, if the crankcase vent tube pressure sensor is an absolute pressure sensor, barometric pressure may be inferred based on the output of the crankcase vent tube pressure sensor or based on an offset between the vent tube pressure sensor and a coupled BP sensor. With reference to map 900, P1 (extended over the map as a dashed line) reflects the reference inferred BP when the crankcase vent tube pressure sensor is an absolute pressure sensor. In an alternate example, crankcase vent tube pressure sensor may be a gauge pressure sensor, wherein an offset of the pressure sensor reading from a zero reading is learned such that P1 on map 900 reflects a reference calibrated zero pressure.

During intermediate manifold air flow conditions, such as when manifold air flow is higher than first threshold AF1 but lower than second threshold AF2, no offset may be learned or applied. Then, when high manifold air flow conditions are attained, such as when manifold air flow is higher than second threshold AF2, the learned offset may be applied to determine an air filter plugging factor.

Plot 902 shows deviations in crankcase vent tube pressure from reference P1, as estimated by a crankcase vent tube pressure sensor, relative to changes in manifold air flow in the absence of air filter plugging (that is, a clean air filter). Plot 904 shows a corresponding deviation in crankcase vent tube pressure from P1, relative to manifold air flow, when the air filter is partially plugged. Plot 906 shows changes in crankcase vent tube pressure relative to manifold air flow when the air filter is dirty and is substantially plugged. As can be seen by comparing plots 902-906, as the plugging factor of the air filter increases, a deviation of the pressure from the reference P1 increases. A controller may determine the degree of filter plugging based on the degree of deviation. In this way, an existing sensor used for crankcase ventilation system monitoring can be advantageously used to also reliably diagnose air filter plugging.

In this way, by positioning a pressure sensor within a crankcase vent tube, changes in pressure and air flow through the vent tube can be monitored, while packaging the sensor in a cost-efficient manner. By correlating the estimated changes in vent tube pressure with expected values, crankcase system integrity, air filter degradation and PCV valve degradation may be reliably indicated. By relying on characteristics of crankcase vent tube pressure and flow data during engine cranking as well as engine running, breaches in the crankcase ventilation system located at a side of the vent tube coupled to an air intake passage can be better distinguished from those occurring at a side of the vent tube coupled to a crankcase. By making adjustments to a throttle and/or PCV valve to enhance intake manifold vacuum during engine cranking, an accuracy of crankcase breach detection can be increased. By using the crankcase ventilation system pressure sensor to also identify air filter plugging, as well as PCV valve degradation, the need for additional sensors and valves for monitoring air filter degradation and PCV valve degradation can be reduced, providing cost and complexity reduction benefits without reducing accuracy of degradation detection. Further, an engine crankcase ventilation system can remain active during the diagnostic procedures.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine crankcase ventilation system, comprising:
an engine including an intake passage and a crankcase;
a starter motor;
a crankcase vent tube mechanically connected to the intake passage upstream of a compressor, the tube also mechanically connected to the crankcase via an oil separator, the vent tube located external to the engine;
a sensor coupled in the crankcase vent tube for estimating a vent tube pressure; and
a control system with computer readable instructions for, during an engine start,
cranking the engine with the starter motor, and indicating crankcase ventilation system degradation based on each of a transient dip in the vent tube pressure being lower than a threshold amplitude during engine cranking when manifold airflow is below a threshold and a change in vent tube vacuum being lower than a change in manifold airflow during engine running when manifold air flow is above the threshold, wherein the engine is cranked by the starter motor at least before a first combustion event from rest.

2. The system of claim 1, wherein indicating crankcase ventilation system degradation includes setting a diagnostic code to indicate that the crankcase vent tube is disconnected from at least one of the intake passage and the crankcase.

3. The system of claim 2, wherein the sensor is one of a pressure sensor, a flow sensor, and a venturi, the system further comprising a barometric pressure sensor in the intake passage for estimating a barometric pressure, and wherein the vent tube pressure is estimated based on an output of the sensor in the crankcase vent tube, the output adjusted with an offset based on the estimated barometric pressure.

4. A method for an engine, comprising:
starting an engine from rest by cranking the engine with a starter motor;
indicating crankcase ventilation system degradation based on characteristics of a transient dip in crankcase vent tube pressure, during engine cranking; and
in response to the indication, limiting an engine load of the engine.

5. The method of claim 4, wherein based on characteristics of the transient dip includes based on an amplitude of the transient dip.

6. The method of claim 5, wherein the indicating includes indicating crankcase ventilation system degradation based on the amplitude of the transient dip being smaller than a threshold amount.

7. The method of claim 6, wherein the threshold amount is based on intake manifold vacuum during the engine cranking, the threshold amount increased as an expected flow through a PCV valve changes.

8. The method of claim 7, wherein during engine cranking includes before a first combustion event from rest.

9. The method of claim 8, wherein indicating crankcase ventilation system degradation includes indicating that a crankcase vent tube is disconnected.

10. The method of claim 9, wherein one end of the crankcase vent tube is mechanically coupled to an engine intake passage, upstream of a compressor, and another, opposite end of the crankcase vent tube is mechanically coupled to an engine crankcase via an oil separator.

11. The method of claim 6, wherein crankcase vent tube pressure for identifying the amplitude of the transient dip is estimated by a pressure sensor in a crankcase vent tube.

12. The method of claim 11, further comprising, after an engine speed reaches a threshold speed, indicating crankcase ventilation system degradation based on a change in crankcase vent tube pressure relative to a change in manifold airflow through the engine.

13. The method of claim 12, wherein the indicating includes indicating that the crankcase vent tube is disconnected based on a decrease in crankcase vent tube pressure not being proportional to an increase in manifold airflow over a duration while the engine speed is at or above the threshold speed.

14. The method of claim 4, wherein the indicating includes setting a diagnostic code.

15. A method for an engine, comprising:
    starting an engine from rest by cranking the engine with a starter motor; and
    indicating disconnection of a crankcase vent tube from an engine crankcase ventilation system based on a transient change in airflow through the crankcase vent tube during the engine cranking.

16. The method of claim 15, wherein the transient change in airflow is estimated by a flow sensor coupled in the crankcase vent tube.

17. The method of claim 16, wherein the flow sensor includes a venturi.

18. The method of claim 16, wherein the transient change in airflow is based on a transient dip in crankcase vent tube pressure estimated by a pressure sensor coupled in the crankcase vent tube.

19. The method of claim 18, wherein during engine cranking includes when manifold airflow is less than a threshold, the method further comprising, after the manifold airflow is at the threshold, indicating disconnection of the crankcase vent tube based on a rate of decrease in steady-state crankcase vent pressure relative to a rate of increase in steady-state manifold airflow while the engine is running above an idle speed.

20. The method of claim 19, wherein the indicating includes, indicating disconnection of the crankcase vent tube based on the rate of decrease in steady-state crankcase vent pressure not being proportional to the rate of increase in steady-state manifold airflow.

* * * * *